United States Patent [19]
Uchida

[11] Patent Number: 5,671,712
[45] Date of Patent: Sep. 30, 1997

[54] INDUCTION SYSTEM FOR ENGINE

[75] Inventor: Masahiro Uchida, Iwata, Japan

[73] Assignee: Yamaha Hatsudoki Kabushiki Kaisha, Iwata, Japan

[21] Appl. No.: 454,822

[22] Filed: May 31, 1995

Related U.S. Application Data

[63] Continuation-in-part of Ser. No. 378,532, Jan. 24, 1995, Pat. No. 5,477,823.

[30] Foreign Application Priority Data

| Jan. 25, 1994 | [JP] | Japan | 6-006671 |
| Jan. 25, 1994 | [JP] | Japan | 6-006672 |
| May 31, 1994 | [JP] | Japan | 6-118566 |
| May 31, 1994 | [JP] | Japan | 6-118609 |

[51] Int. Cl.$^6$ ............... F02B 29/00; F02D 9/08
[52] U.S. Cl. ............ 123/308; 123/336; 123/337
[58] Field of Search ............... 123/308, 432, 123/590, 336, 337

[56] References Cited

U.S. PATENT DOCUMENTS

| 1,727,265 | 3/1929 | Aseltine. |
| 3,318,292 | 5/1967 | Hideg. |
| 3,408,992 | 11/1968 | Seggern et al.. |
| 4,105,577 | 8/1978 | Yamashita. |
| 4,174,686 | 11/1979 | Shimizu et al.. |
| 4,228,772 | 10/1980 | Bakonyi. |
| 4,240,387 | 12/1980 | Motosugi et al.. |
| 4,256,062 | 3/1981 | Schafer. |
| 4,269,153 | 5/1981 | Kunii et al.. |
| 4,308,830 | 1/1982 | Yamada et al.. |
| 4,317,438 | 3/1982 | Yagi et al.. |
| 4,320,725 | 3/1982 | Rychlik et al.. |
| 4,354,463 | 10/1982 | Otani et al.. |
| 4,413,598 | 11/1983 | Tsutsumi. |
| 4,428,334 | 1/1984 | Klomp. |
| 4,452,218 | 6/1984 | Yokoyama et al.. |
| 4,499,868 | 2/1985 | Kanda et al.. |
| 4,543,931 | 10/1985 | Hitomi et al.. |
| 4,663,938 | 5/1987 | Colgate. |
| 4,669,434 | 6/1987 | Okumura et al.. |
| 4,700,669 | 10/1987 | Sakurai et al.. |
| 4,704,996 | 11/1987 | Morikawa. |
| 4,714,063 | 12/1987 | Oda et al.. |
| 4,719,886 | 1/1988 | Kotani et al.. |
| 4,753,200 | 6/1988 | Kawamura et al.. |
| 4,762,102 | 8/1988 | Kanda. |
| 4,779,594 | 10/1988 | Oda et al.. |
| 4,826,561 | 5/1989 | Tsutsumi. |
| 4,827,883 | 5/1989 | Khalighi et al.. |
| 4,834,035 | 5/1989 | Shimada et al.. |
| 4,930,468 | 6/1990 | Stockhausen. |
| 4,974,566 | 12/1990 | LoRusso et al.. |
| 4,995,359 | 2/1991 | Yokoyama et al.. |
| 4,998,518 | 3/1991 | Mitsumoto. |

FOREIGN PATENT DOCUMENTS

| 0054964 | 6/1982 | European Pat. Off.. |
| 0068481 | 1/1983 | European Pat. Off.. |
| 0074202 | 3/1983 | European Pat. Off.. |

(List continued on next page.)

OTHER PUBLICATIONS

European Search Report dated Oct. 5, 1992 w/ Patent Abstract.
European Search Report dated Nov. 23, 1992 w/Patent Abstract.

*Primary Examiner*—Erick R. Solis
*Attorney, Agent, or Firm*—Knobbe, Martens, Olson & Bear LLP

[57] ABSTRACT

An induction system and control arrangement for a three valve per cylinder engine, wherein the induction passages are tuned to provide different effective lengths for different engine running conditions. In addition, a control valve arrangement is provided for controlling the flow to the combustion chambers through the valve seats to generate unrestricted flow under high-speed, high-load conditions and tumble and/or tumble and swirl for promoting turbulence under low-speed, low-load conditions.

59 Claims, 30 Drawing Sheets

FOREIGN PATENT DOCUMENTS

| | | |
|---|---|---|
| 0076632 | 4/1983 | European Pat. Off. |
| 0221312 | 5/1987 | European Pat. Off. |
| 0235288 | 9/1987 | European Pat. Off. |
| 449240 | 10/1991 | European Pat. Off. |
| 2569227 | 8/1986 | France. |
| 2709519 | 9/1977 | Germany. |
| 3429414 | 2/1985 | Germany. |
| 3638021 | 5/1987 | Germany. |
| 51-54007 | 12/1976 | Japan. |
| 56-43428 | 4/1981 | Japan. |
| 56-139829 | 10/1981 | Japan. |
| 59-5767 | 2/1984 | Japan. |
| 59-120718 | 7/1984 | Japan. |
| 60-11206 | 3/1985 | Japan. |
| 61-12940 | 1/1986 | Japan. |
| 61-28715 | 2/1986 | Japan. |
| 61-144223 | 9/1986 | Japan. |
| 63-32122 | 2/1988 | Japan. |
| 63-73532 | 2/1988 | Japan. |
| 63-73534 | 5/1988 | Japan. |
| 2115922 | 9/1990 | Japan. |
| 2230920 | 9/1990 | Japan. |
| 60523 | 2/1948 | Netherlands. |
| 652671 | 5/1951 | United Kingdom. |
| 1135482 | 12/1968 | United Kingdom. |
| 1293772 | 10/1972 | United Kingdom. |
| 1457152 | 12/1976 | United Kingdom. |
| 2016081 | 9/1979 | United Kingdom. |
| 2027796 | 2/1980 | United Kingdom. |
| 2064646 | 6/1981 | United Kingdom. |
| 2087480 | 5/1982 | United Kingdom. |
| 2107780 | 5/1983 | United Kingdom. |
| 2196386 | 4/1988 | United Kingdom. |
| 2196388 | 4/1988 | United Kingdom. |
| 2242226 | 9/1991 | United Kingdom. |
| 7900501 | 8/1979 | WIPO. |
| 9114858 | 10/1991 | WIPO. |

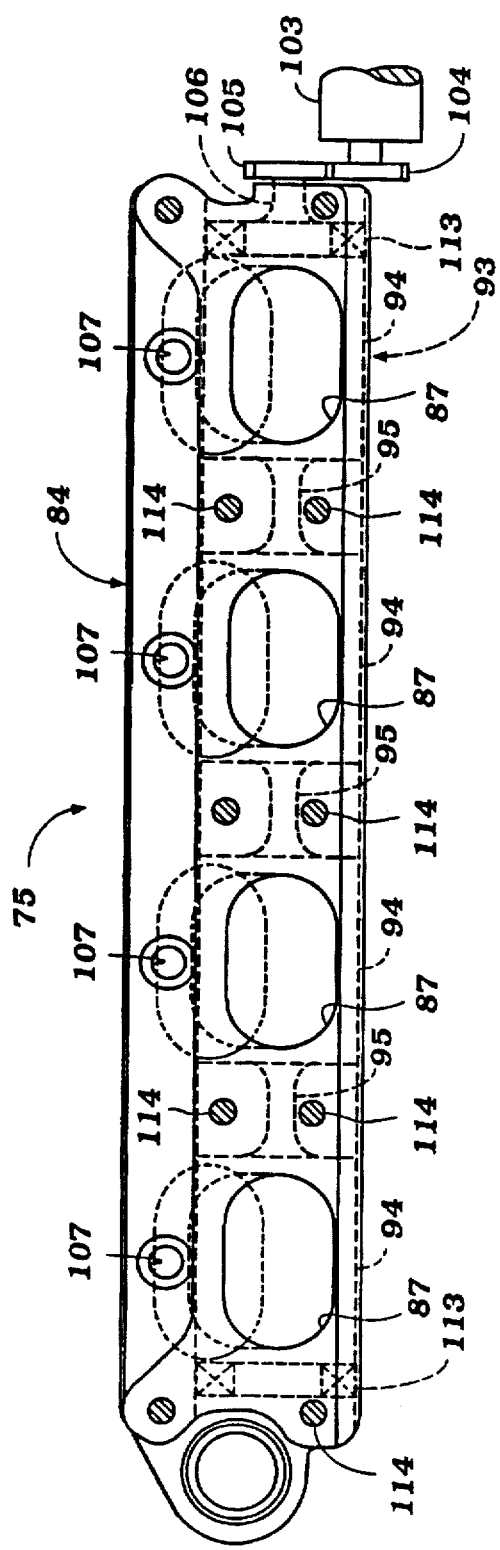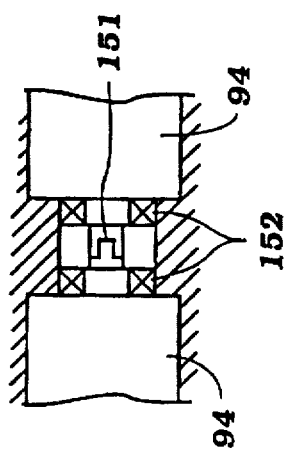
Figure 5
Figure 6

INDUCTION SYSTEM FOR ENGINE

CROSS-REFERENCE TO RELATED APPLICATION

This application is a continuation-in-part of my application entitled "CONTROL VALVE FOR ENGINE INTAKE CONTROL SYSTEM," Ser. No. 08/378,532, now U.S. Pat. No. 5,477,823, filed Jan. 24, 1995, and assigned to the assignee hereof.

BACKGROUND OF THE INVENTION

This invention relates to an induction system for an internal combustion engine and more particularly to an improved control valve arrangement for an engine intake control system.

It has been known that the performance of an engine and particularly its power output can be substantially increased by employing multiple intake valves. Therefore, it is a common practice with many engines, particularly of the automotive type, to employ two intake valves per cylinder. However, the advantages of employing even more, and specifically three intake valves for each cylinder, are becoming recognized.

Although the use of multiple intake valves can be effective in increasing the power output of an engine, the use of such free-breathing induction systems can deteriorate the performance at low speeds and mid-range. The reason for this is that the intake charge flows relatively slowly into the combustion chambers under these conditions with the free-breathing intake passages. As a result, there is low turbulence in the combustion chamber and flame propagation under these low speed, low load conditions deteriorates.

In order to further improve the performance of three valve per cylinder engines, particularly under low speed running, it has been proposed to employ various tuning devices for the induction system. Although these tuning devices can improve volumetric efficiency, they still may not totally solve the problems under all conditions.

It is, therefore, a principal object of this invention to provide an improved control valve arrangement for a multi-valve engine wherein the control valve can be employed to generate turbulence in the combustion chamber without restricting the output at high-load and high-speed conditions.

It is a further object of this invention to provide an improved control valve assembly for a multi-valve engine wherein the desired types of turbulence can be generated in the combustion chamber under varying running conditions.

It has also been acknowledged that turbulence in the combustion chamber is effective under some running conditions so as to improve engine performance. Turbulence helps to increase the rate of flame propagation and ensures complete burning. However, the type of turbulence which is generated can be significant in controlling and improving engine performance. One type of turbulence, called "swirl," is by a rotary motion around the cylinder bore axis. This type of turbulence is relatively easy to generate, particularly with three-valve-per-cylinder engines. However, a different type of turbulence known as tumble has been found to give better performance under some running conditions. Tumble is a type of swirling motion, but the motion occurs about an axis that extends generally transversely to the cylinder bore axis. This type of motion is more difficult to generate, particularly with three-valve-per-cylinder engines.

It is, therefore, a still further object of this invention to provide an improved three-intake-valve-per-cylinder engine having a control valve that is usable to generate tumble in the combustion chamber under some running conditions.

In my aforenoted copending application Ser. No. 08/378,532, under low-speed and low-load conditions, the control valve directs the intake charge into the combustion chamber primarily to two of the three intake valve seats. Embodiments are shown wherein the flow through the remaining valve seat is restricted under this condition and the flow is directed either to both of the side intake valves or one of the side intake valves and the center intake valve. Although this arrangement is particularly useful, in some instances it may be desirable to direct the flow through primarily one of the valve seats under certain running conditions.

It is, therefore, a still further object of this invention to provide an induction system for a multi-valve engine wherein under some running conditions the flow is directed primarily into the combustion chamber through one of three or more intake valve seats.

It is a further object of this invention to provide an improved control valve arrangement for a multi-valve engine wherein the control valve directs the flow primarily to one of three or more intake valve seats under some running conditions and the flow to this one valve seat is in a different direction than when the control valve is in its opened position.

As is noted in my aforenoted copending application Ser. No. 08/378,532, the control valve arrangement can be simplified if the intake valve seats all are served by a flow passage that has a common section in which the control valve is positioned. This simplifies the number and placement of the control valves in the engine. However, if it is desired to shut off the flow or substantially restrict the flow through one or more of the valve seats, then the overall body of the control valve becomes quite large, particularly in diameter. Of course, it is desirable to maintain the control valve position as close as possible to the combustion chamber so that the optimum flow effects in the combustion chamber can be obtained. However, where large control valves are employed, this becomes difficult.

It is, therefore, a still further object of this invention to provide an improved and simplified control valve arrangement for a multi-valve engine.

It is a further object of this invention to provide a control valve for a multi-valve engine wherein the control valve is capable of controlling the flow through all of the intake valve seats and yet has a compact construction and one which permits the control valve to be positioned close to the combustion chamber.

One way in which the control valve may be kept compact is by having it as a cylindrical body but which has a larger diameter portion that substantially restricts the flow through some of the intake valve seats when in its closed position and a smaller diameter portion that controls the flow to the remaining valve seat or seats when in its flow controlling position. However, such stepped diameter control valves can present problems in assembly, particularly when a single control valve assembly controls the flow to a plurality of combustion chambers that are in line with each other. If a single control valve bore supports the entire control valve assembly then it obviously must have the same diameter as the largest portion of the control valve and this means that the overall size tends to become large.

It is, therefore, a still further object of this invention to provide an improved control valve assembly for a multi-cylinder engine wherein stepped diameter portions can be utilized and the supporting bore for the control valve need not be of a uniform diameter large enough to accommodate the largest portion of the control valve.

SUMMARY OF THE INVENTION

A first feature of this invention is adapted to be embodied in an induction system for an internal combustion engine having a combustion chamber served by at least three valve seats. An intake passage arrangement comprised of at least a common section serves each of the valve seats. A control valve is supported in the common section for controlling the flow therethrough and is movable between a first position wherein the flow through each of the valve seats is substantially unrestricted and without significantly affecting the flow direction issuing from the valve seats into the combustion chamber. In a second position, the control valve substantially restricts the flow through one of the valve seats, and the flow through another one of the valve seats is directed into the combustion chamber in a different direction than when the control valve is in its first position.

Another feature of the invention is also adapted to be embodied in an induction system for an internal combustion engine having a combustion chamber served by at least three valve seats. The valve seats are served by an intake passage arrangement that includes a common section in which a control valve is rotatably journalled. A control valve has a first, larger diameter portion that is journalled in a housing having a corresponding larger diameter portion. The control valve further includes a second smaller diameter portion which is rotatably journalled in a smaller diameter portion of the housing.

BRIEF DESCRIPTION OF THE DRAWINGS

FIG. 5 is a side elevational view of the control valve assembly.

FIG. 6 is a partial view showing another type of arrangement for a control valve assembly.

DETAILED DESCRIPTION OF THE PREFERRED EMBODIMENTS OF THE INVENTION

Figure 1:
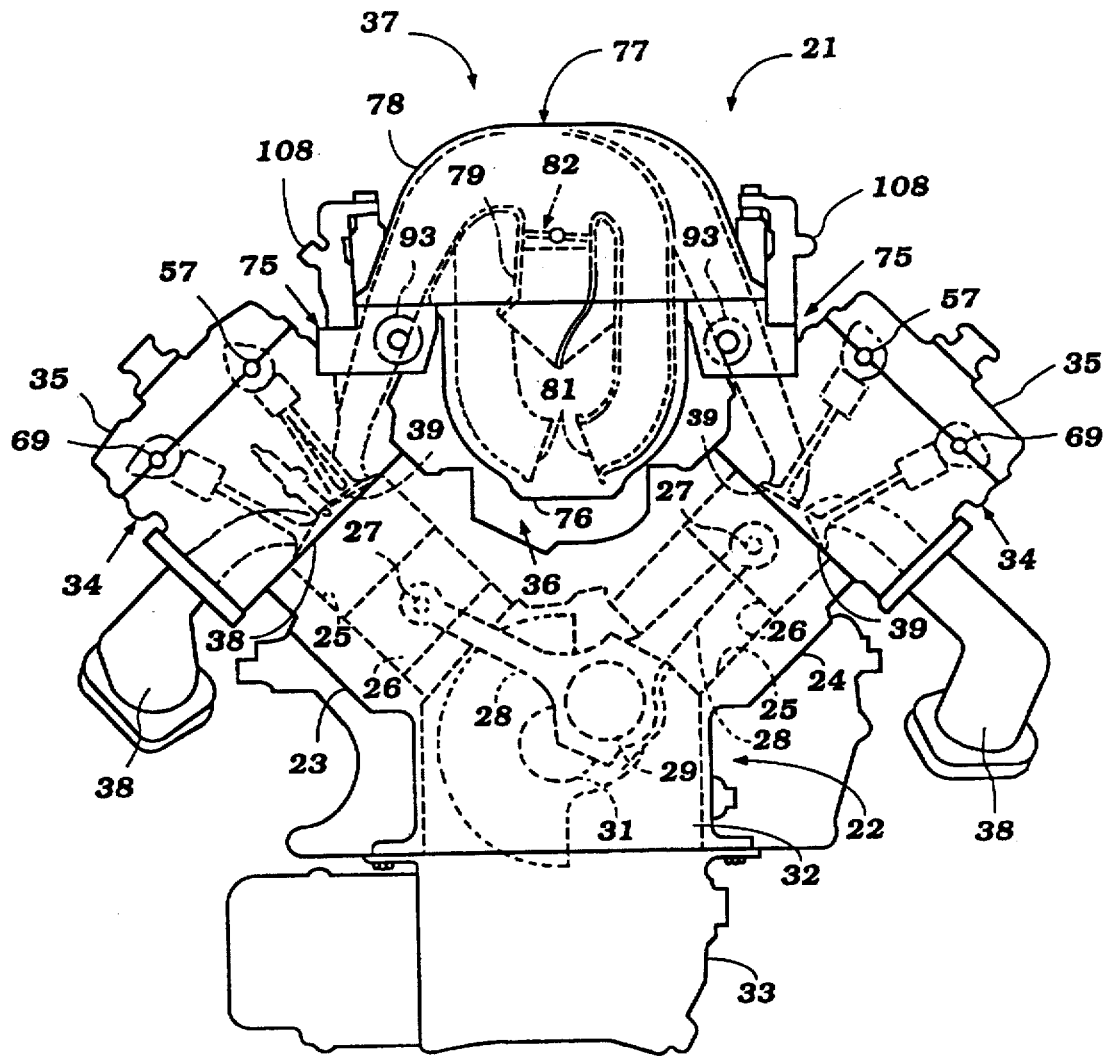
FIG. 1 is a front elevational view of an internal combustion engine constructed in accordance with a first embodiment of the invention.

Referring now in detail to the drawings and initially to FIG. 1, an internal combustion engine constructed in accordance with an embodiment of the invention is indicated generally by the reference numeral 21. As will become apparent, the engine 21 is of the V-8 type and operates on a four-stroke principle. Although the invention is described in conjunction with such an engine, it will be readily apparent to those skilled in the art that certain facets of the invention may be employed with engines having other cylinder numbers and other cylinder configurations. It is believed well within the scope of those skilled in the art to understand how the features of the invention may be employed with such other engines.

The engine 21 is comprised of a cylinder block, indicated generally by the reference numeral 22, having two angularly inclined cylinder banks 23 and 24, each of which is formed with four respective cylinder bores 25. In the illustrated embodiment, the angle between the cylinder banks 23 and 24 is 90°.

Pistons 26 are slidably supported within each of the cylinder bores 25. These pistons 26 are connected by means of piston pins 27 to the upper or small ends of respective connecting rods 28. As is typical with V-type engine practice, the cylinder bank 23 is staggered slightly in an axial direction relative to the cylinder bank 24 so that the connecting rods 28 of respective cylinders of the banks 23 and 24 can be journalled on common throws 29 of a crankshaft 31. The crankshaft 31 is rotatably journalled in a well-known manner within a crankcase chamber formed by a skirt 32 of the cylinder block 22 and a crankcase member 33 that is detachably affixed thereto in a known manner.

The construction of the cylinder block 22 and those components which are contained within it and the crankcase member 33 may be considered to be conventional. Since the invention deals primarily with the induction system, to be described later, further details of the construction of the lower portion of the engine is not believed to be necessary to permit those skilled in the art to practice the invention. For that reason, further description of these conventional components will not be made.

Cylinder heads 34 are affixed to each of the cylinder banks 23 and 24 in a manner which will be described. Also, the detailed construction of the cylinder heads 34 and the mechanisms contained therein will be described by reference to FIG. 2 and related, copending applications. Cam covers 35 are affixed to the cylinder heads 34 in a suitable manner.

It should be noted that the cylinder banks 23 and 24 and the attached cylinder heads 34 and attached cam covers 35 define a valley between them, which valley is indicated generally by the reference numeral 36. An induction system, indicated generally by the reference numeral 37 and which also will be described later in more detail by reference to the remaining figures, since it embodies the invention, is disposed in this valley 36 for supplying a fuel-air charge to the individual combustion chambers of the engine 21.

Exhaust manifolds 38 are affixed to the outer sides of the cylinder heads 34 and discharge the exhaust gases to the atmosphere through any conventional type of exhaust system (not shown).

The configuration of the combustion chambers for the engine will now be described by primary reference to FIGS. 2–4. It should be initially noted that the cylinder heads 34 for each of the cylinder banks 23 and 24 are substantially identical in construction, with the cylinder head 34 for the bank 23 being placed onto the bank 23 in the one direction. When the same cylinder head 34 is attached to the cylinder bank 24, the head 34 will be reversed from this position. This permits the use of a single casting for both sides of the engine 21 with obvious cost advantages.

The cylinder head 34 has a lower sealing surface 38 that is affixed to the upper end of the respective cylinder block 23 or 24 by fasteners 40 so as to effect a tight gas seal therewith. The cylinder head surface 38 is provided with individual recesses 39 which cooperate with the cylinder bores 25 and the heads of the pistons 26 to form the combustion chambers for the engine 21. In a preferred form, the combustion chambers have a generally lens-shaped configuration, as described in the copending application of Masaaki Yoshikawa, entitled "Engine Combustion Chamber and Air Intake Device," Ser. No. 08/354,539, filed Dec. 13, 1994, and assigned to the assignee hereof. Where any details of the combustion chamber configuration are not described herein, reference may be had to that copending application, the disclosure of which is incorporated herein by reference, for such details.

Figure 2:
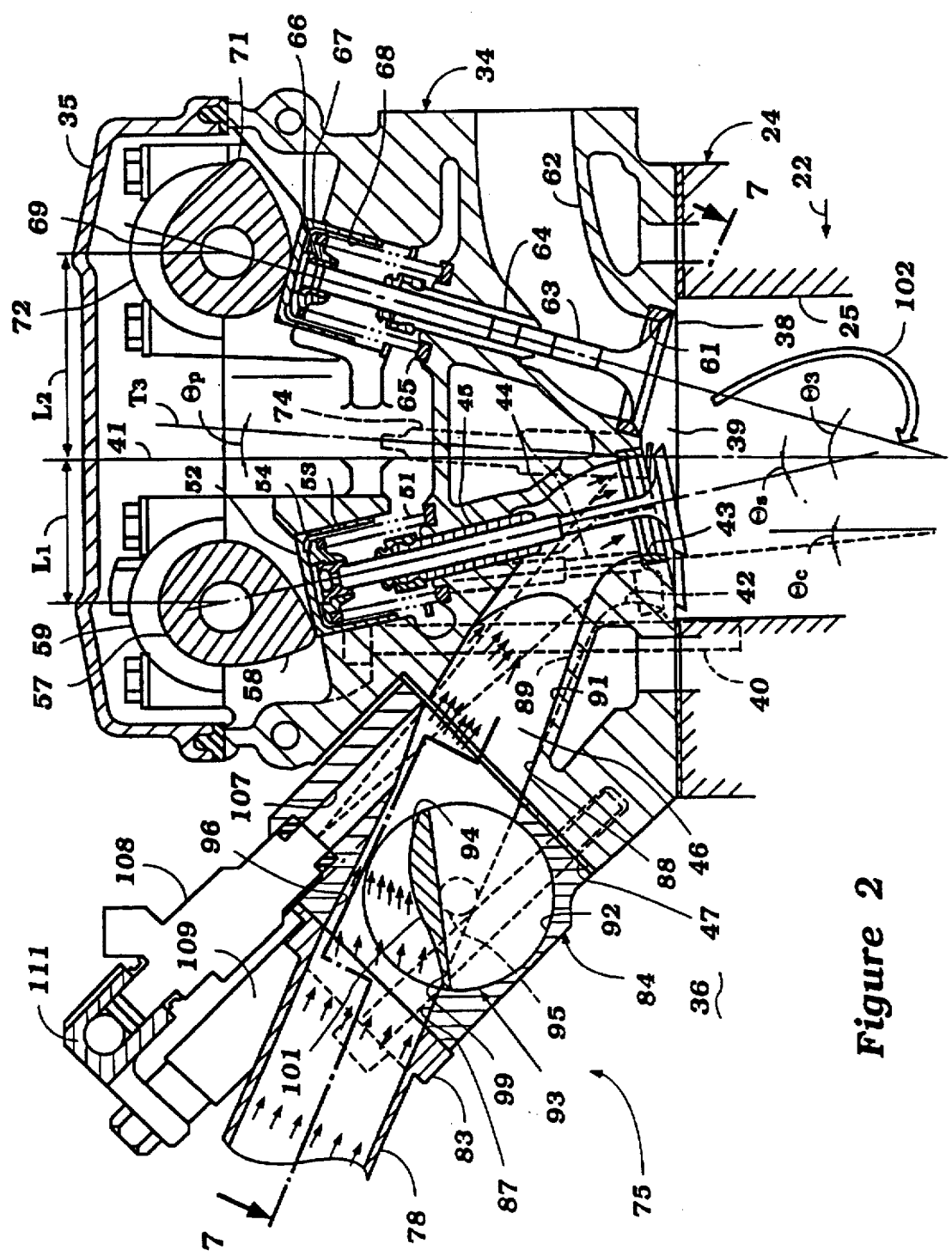
FIG. 2 is an enlarged cross-sectional view taken through one of the cylinder banks and shows the induction system and the flow control valve in a first position.

The axes of the individual cylinder bores 25 are indicated in FIG. 2 and identified by the reference numeral 41 for orientation purposes. On one side of a plane containing the cylinder bore axis 41 there is provided a center intake valve seat 42. This intake valve seat 42 is disposed generally on the outer periphery of the cylinder bore 25 and is spaced the greatest distance from the cylinder bore axis 41.

A further pair of side intake valve seats 43 are disposed closer to the cylinder bore axis 41, but are positioned so as to extend in part across the aforenoted plane containing the cylinder bore axis 41.

Respective poppet-type intake valves 44 are slidably supported in the cylinder head 34 by pressed or cast-in guides 45 and control the flow through the valve seats 42 and 43. The reciprocal axis of the intake valve 44 associated with the center valve seat 42 is disposed at an acute angle $\theta_c$ to a plane which is parallel to the cylinder bore axis 41 and to the aforenoted plane containing it. This plane is offset from the plane containing the cylinder bore axis 41 toward the valley 36 between the cylinder banks 23 and 24.

The intake valves 44 associated with the side intake valve seats 42 have their reciprocal axes lying in a common plane. This plane is also disposed at an acute angle to the plane containing the axis 41. This acute angle, indicated by the dimension $\theta_s$, is greater than the acute angle $\theta_c$.

An intake passage arrangement, indicated generally by the reference numeral 46, extends from an outer surfaces 47 of the cylinder heads 34 on the side adjacent the valley 36 and is served by the intake system 37 in a manner which will be described. The intake passage arrangement 46 in this embodiment is of a Siamesed-type intake passage that serves all of the valve seats 42 and 43. However, other arrangements are possible. The invention, however, has particular use with Siamesed passages having a common portion, for a reason as will become apparent.

Referring again to FIG. 2, coil compression springs 51 encircle the stems of the intake valves 44 and bear against machined surfaces on the cylinder head 34 and keeper retainer assemblies 52 fixed to the upper ends of the stems of the valves 44 for urging the valves 44 to their closed positions. Thimble tappets 53 are slidably supported in tappet-receiving bores 54 formed in the cylinder head 34 for actuating the valves 44. The bores 54 are disposed at the same angle as the reciprocal axes of their respective valve stems 44.

An intake camshaft, indicated generally by the reference numeral 57, is rotatably supported in the cylinder head 34 in a manner which will be described. This intake camshaft 57 is driven in a manner which will also be described at one-half crankshaft speed. The intake camshaft 57 is provided with three cam lobes 58 for each cylinder which it serves and which are spaced apart by bearing surfaces. These bearing surfaces are, in turn, journalled in the cylinder head 54 in bearings formed integrally in the cylinder head.

The intake camshaft 57 is supported for rotation by bearing caps 59 that are affixed to the cylinder head 34 in the manner described in the copending application of Tateo Aoyoma and Masahiro Uchida, entitled "Cylinder Head Arrangement for Multi-Valve Engine," Ser. No. 08/363,412, filed Dec. 23, 1994 (attorney docket no. YAMAH2.847A), and assigned to the assignee hereof. In fact, that copending application discloses further details of the construction of the cylinder head 34, the way in which the tappet-receiving bores 54 are formed, and other details of the cylinder head arrangement. That disclosure is incorporated herein by reference. Since this invention deals primarily with the induction system for the engine, it is believed that the details of the construction of the cylinder heads except for what are given herein are not necessary for those skilled in the art to practice the invention.

Figure 3:
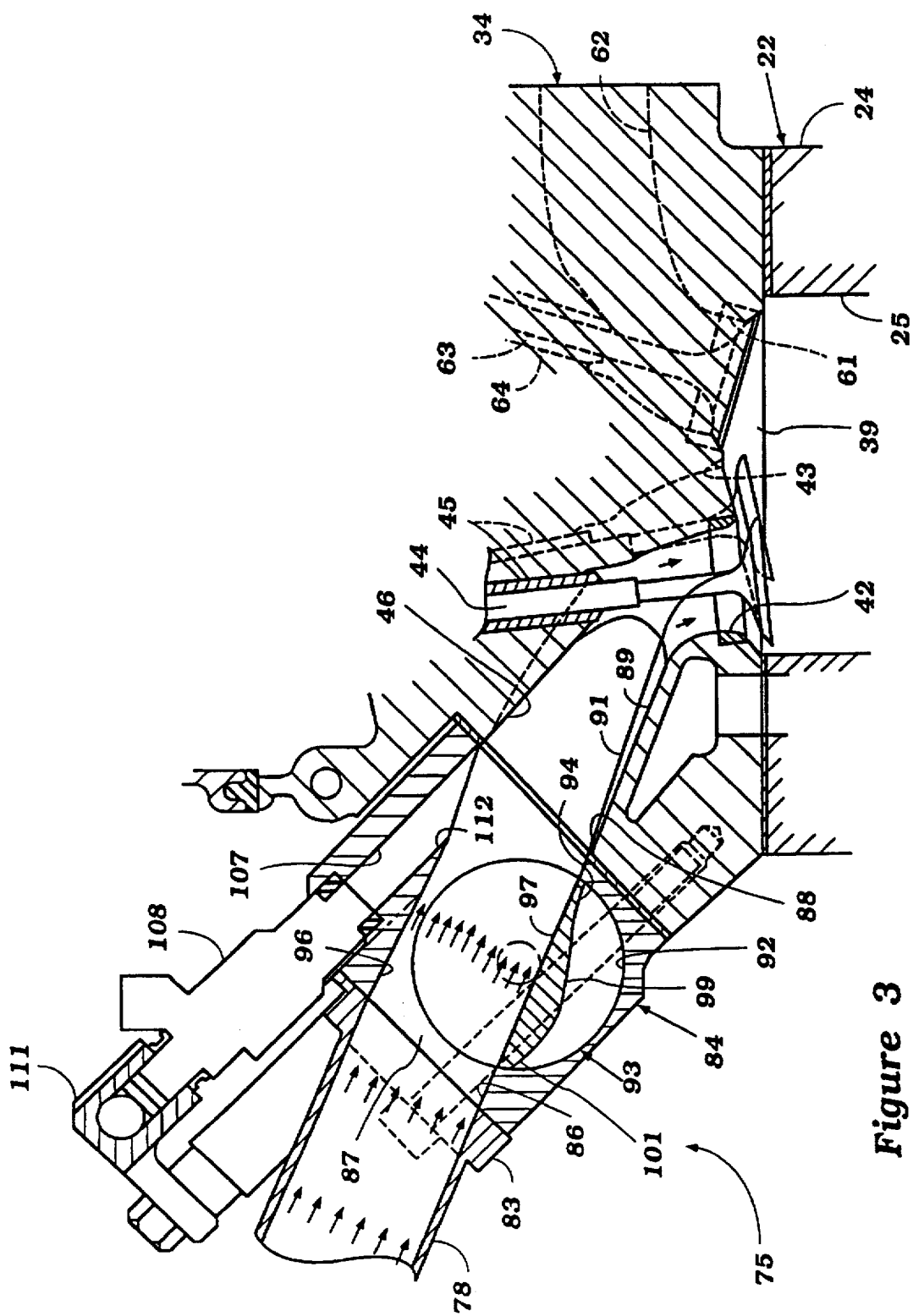
FIG. 3 is a further enlarged cross-sectional view, in part similar to FIG. 2, and shows the control valve in a second position.
Figure 4:
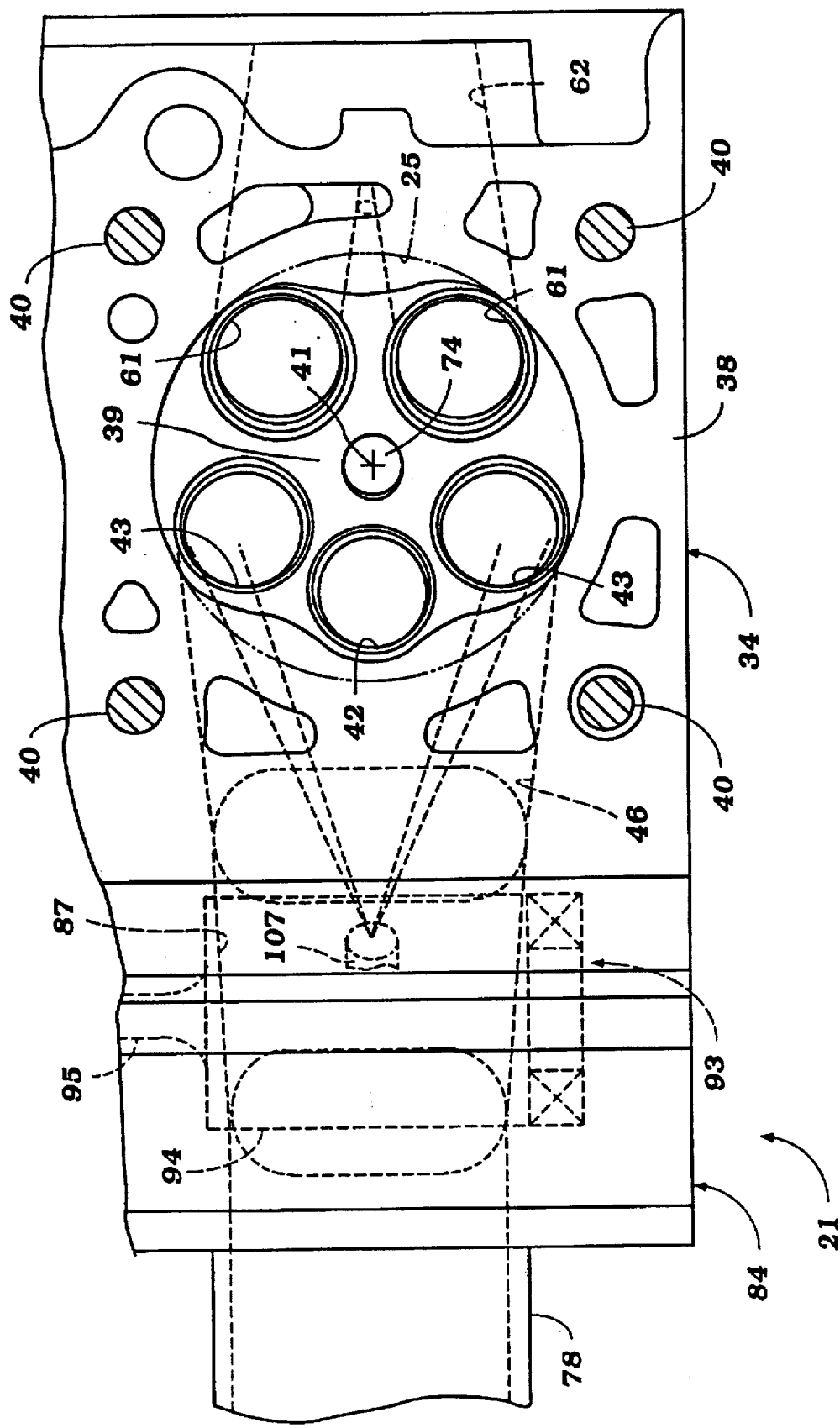
FIG. 4 is a bottom plan view of the cylinder head showing the combustion chamber configuration and, in phantom, the intake and exhaust passages.

Continuing to refer to FIGS. 2–4, a pair of exhaust valve seats 61 are formed in the cylinder head recesses 39 on the side of the plane 41 opposite to the center intake valve seat 42. These exhaust valve seats 61 are formed at the beginning of exhaust passages 62, which extend through the exhaust side of the cylinder heads 34 and which terminate at the exhaust manifolds 38 previously referred to and illustrated in FIG. 1. The exhaust passages 62 may be of the Siamesed type, or if preferred, individual passages may be employed for each exhaust valve seat 61.

Exhaust valves 63 are slidably supported for reciprocation in the cylinder head 34 by valve guides 64 that are inserted into the cylinder head 34 in any suitable manner. The axes of reciprocation of the exhaust valves 63 lie in a common plane that is disposed at an angle $\theta_e$ to the plane containing the cylinder bore axis 41. The angle $\theta_e$ is equal to or greater than the angle $\theta_s$ of the side intake valves and substantially greater than the angle $\theta_c$ of the center intake valve.

Coil compression springs 65 encircle the stems of the exhaust valves 62 and act upon keeper retainer assemblies 66 for urging these valves to their closed position in seating engagement with the valve seats 61.

The exhaust valves 63 are opened by thimble tappets 67 that are slidably supported in bores 68 formed in the cylinder head 34. The bores 68 extend parallel to the axes of reciprocation defined by the valve guides 64 and extend downwardly from the upper cylinder head surface, as described in the aforenoted copending application, Ser. No. 08/363,412.

An exhaust cam shaft 69 is provided that has individual cam lobes 71 that engage each of the exhaust valve tappets 67 for operating them. The exhaust cam shaft 69 is journalled in the cylinder head 34 in the manner also described in copending application Ser. No. 08/363,412, which includes bearing caps 72.

As has been noted, the intake and exhaust cam shafts 57 and 69 are driven from the engine crankshaft 31 at one-half crankshaft speed. Any of a wide variety of types of cam shaft drives may be employed, including that described in copending application Ser. No. 08/363,412. As seen in FIG. 2, the intake camshaft 57 rotates about a rotational axis that is disposed at a lesser distance $L_1$ from the cylinder bore axis 41 than is the axis of rotation of the exhaust camshaft 69, this latter distance being indicated by the reference character $L_2$.

The area between the intake and exhaust camshafts 59 and 61 centered over each of the cylinder bores 25 is provided with a spark plug well that extends along an axis indicated at 73 and which is disposed at an acute angle $\theta_p$ relative to the plane containing the cylinder bore axis 41. A spark plug 74 is disposed at the lower end of this well for each cylinder bore 25 and extends into the cylinder head recess 39 for firing the charge which is introduced thereto through the induction system which will now be described.

The induction system 37 of this embodiment will now be described by primary reference to FIGS. 1–12. As has been noted, this induction system 37 is positioned in the valley 36 between the cylinder banks 23 and 24 and cooperates with the cylinder head surfaces 47 for supplying a fuel air charge to the induction passage 46 of the cylinder heads 34.

The induction system 37 is, except for the flow control valves, indicated generally by the reference numerals 75, the same as that disclosed in the copending application entitled "Intake Control System," Ser. No. 08/363,746, filed Dec. 23, 1994, in the names of Kenichi Sakurai, Masami Wada, and Masato Nishigaki and assigned to the assignee hereof the disclosure of which is incorporated herein by reference. Therefore, the portion of the induction system 37 which is the same as that described in the noted copending application Ser. No. 08/363,746, and be described only briefly.

This induction system includes a plenum chamber 76 that is disposed within the valley 36 between the cylinder banks 23 and 24, but which is spaced inwardly from it to provide a cooling air flow therearound. This plenum chamber 76 is provided with an atmospheric air inlet (not shown) in which a manually positioned throttle valve is contained for controlling the speed of the engine.

The plenum chamber 76 supplies air to an intake manifold, indicated generally by the reference numeral 77, and which has individual runner sections 78 which terminate in respective passages (to be described) of the control valve assembly 75 for delivering the air to the cylinder head intake passages 46.

In order to permit tuning of this induction system for a wide variety of engine speed and load ranges, each manifold runner 78 is served by a relatively short, high-speed intake passage 79 that communicates with the plenum chamber 76, and a second, relatively long primary intake passage 81. The passages 81 also terminate within the plenum chamber 76. The orientation and formation of these passages is described in more detail in the incorporated copending application.

The short, high-speed intake passages 79 all have sections that extend along the center of the engine and through which a throttle valve assembly 82 extends. The valve assembly 82 controls the opening and closing of these short, high-speed intake passages 79. The throttle valve assembly 82 is operated by any desired strategy, but primarily maintains the passages 79 closed at the low speed and low mid-range performance. Thus, the combustion chambers of the engine are served by the longer intake passages 81 which are tuned to provide optimum charging efficiency under their served running conditions. As the engine speed and load increases, the throttle valves 82 are opened automatically, and the effective length of the intake passages is shortened to provide better tuning and charging efficiency for high-speed running conditions.

The manifold runners 78 each have flanges 83 at their cylinder head ends which are affixed in a suitable manner to a valve body 84 of the control valve assembly 75. This valve body 84 is provided with a through-flow passage 86 which has an inlet end 87 that is complementary to the configuration of the runners 78 and which is generally oval in configuration, as may be best seen in FIG. 5. In a like manner, the passage 86 has a correspondingly shaped outlet that corresponds with an inlet opening 88 which is also of complementary shape and which forms the inlet to the individual cylinder head induction passages 46.

From the inlet opening 88, the cylinder head intake passages 44 divide into three generally cylindrically shaped portions comprised of a center portion 89 that serves the center intake valve seat 42 and a pair of side portions 91 which serve the side intake valve seats 43. In this particular embodiment, these portions 89 and 91 have very little dividing area between them and that is only immediately adjacent the respective valve seats 42 and 43.

Referring again to the control valve assembly 75, its main housing 84 is provided with a transversely extending bore 92 that extends through it, with the center of the bore 92 being disposed slightly inwardly of the intake passage 86 for a reason which will become apparent. A generally cylindrically shaped control valve element 93 has individual valving portions 94 which extend across each of the passages 86 associated with each of the cylinder head induction passages 46. Each of the valving portions 94 is separated from the others by means of a short, cylindrical portion 95 that extends between adjacent cylinders.

It should be noted that the valve body 84 is provided on the side opposite that to which the bore 92 is formed with a plurality of recesses 96 that have an elliptical, segmental shape, for a reason which will become readily apparent.

Figure 10:
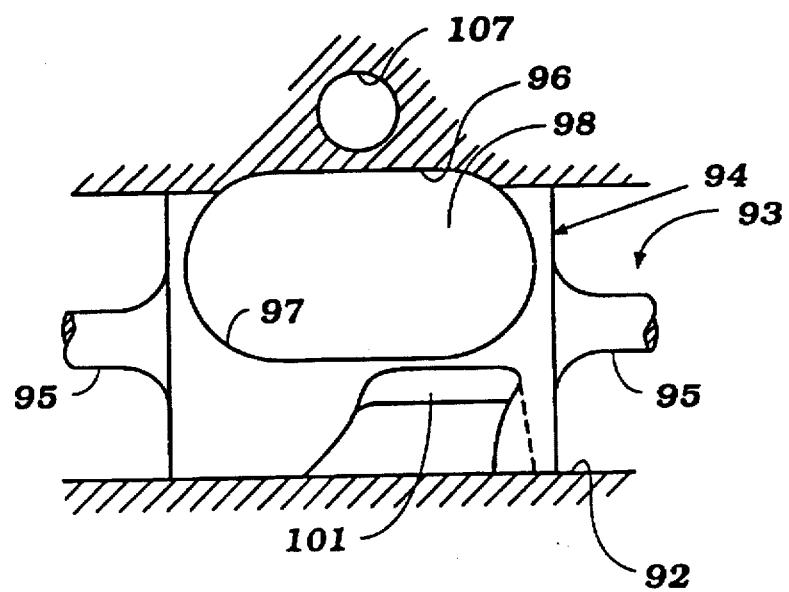
FIG. 10 is a view, in part similar to FIG. 9, and shows the control valve in its second position.
Figure 11:
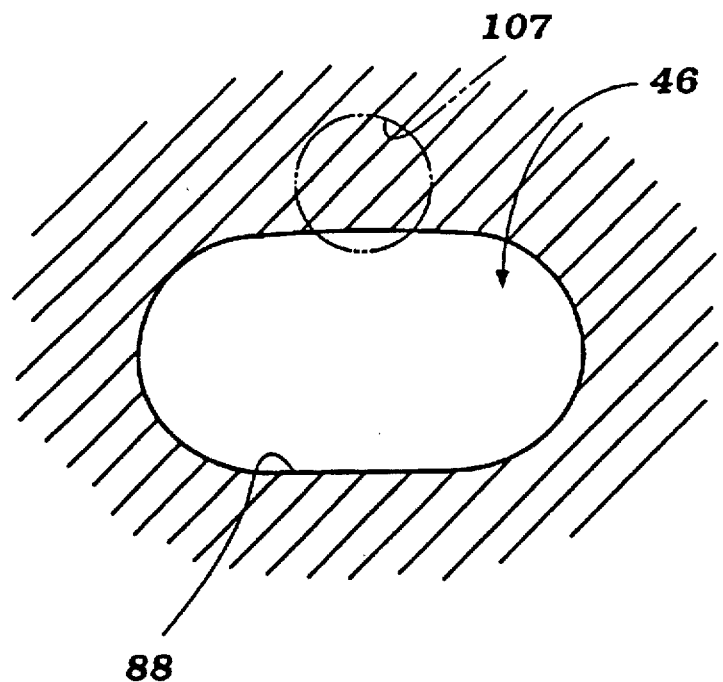
FIG. 11 is a cross-sectional view taken along the line 11—11 of FIG. 7.
Figure 12:
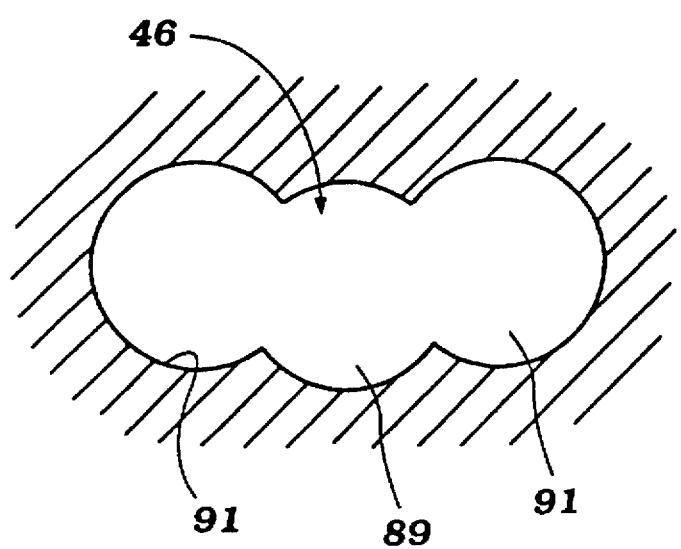
FIG. 12 is a cross-sectional view taken along the line 12—12 of FIG. 7.

Each valve element portion 94 is formed with a first cutout 97 which has a configuration as best shown in FIG. 10 that cooperates with the recess 96 so as to provide an unobstructed flow path 98 which has an elliptical shape complementary to the inlet opening 87 of the valve body 84 and to the inlet opening 88 of the cylinder head intake passage 46. Therefore, when the control valve element 93 is rotated to the position shown in FIGS. 3, 8, and 10, the flow from the intake manifold runner 78 to the valve seats 42 and 43 will be substantially unrestricted and unencumbered. Thus the charge enters the combustion chambers formed by the cylinder head recesses 39 in a generally unobstructed and free-flowing direction. This permits high volumetric efficiency and high engine outputs. However, and as has been noted, this configuration is such that the charge which enters the combustion chamber under low-speed, low-load conditions will be relatively unrestricted, and the flow direction will not cause any significant turbulence. This is undesirable for optimum low and mid-range performance.

Figure 7:
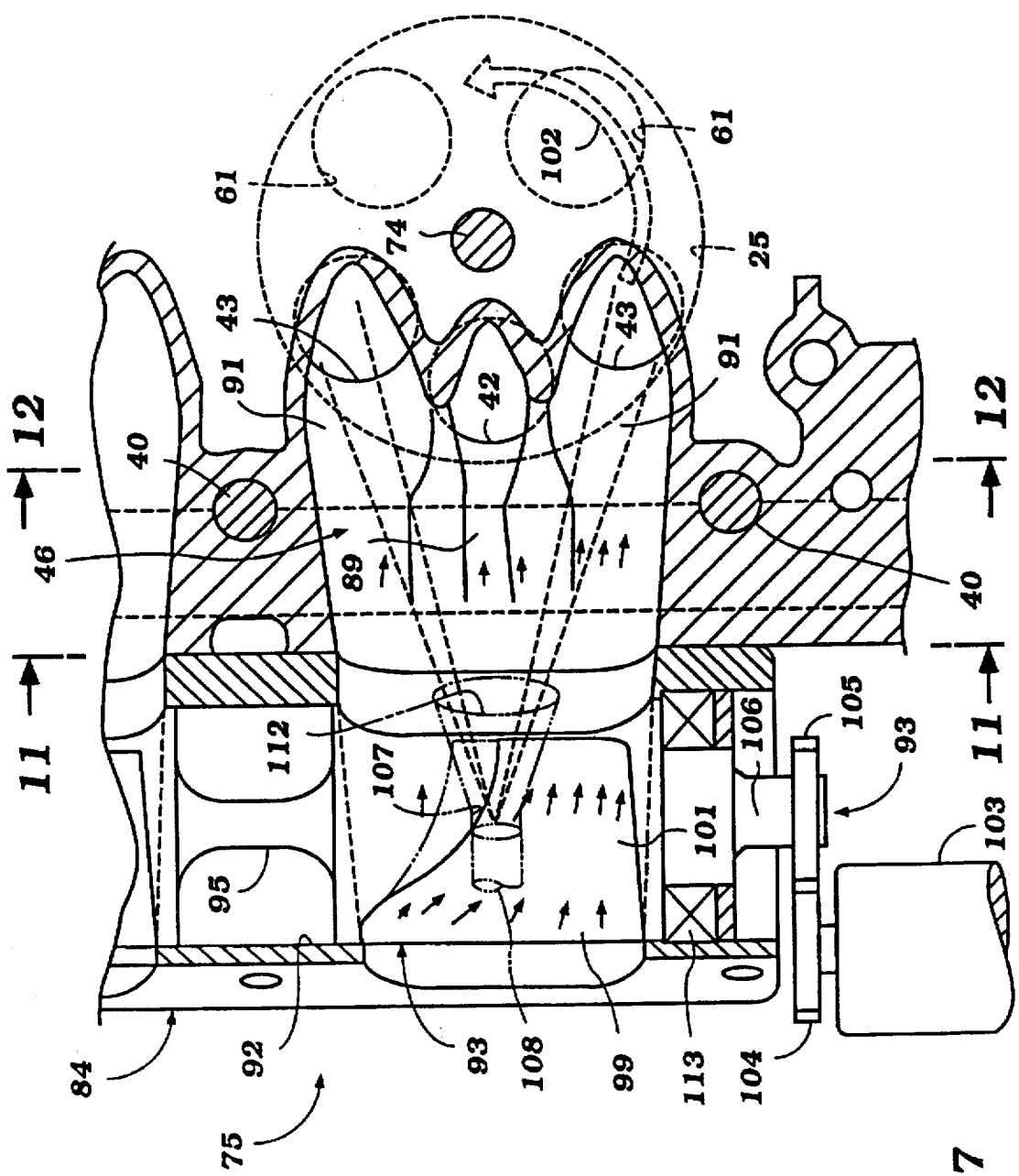
FIG. 7 is a cross-sectional view taken along the line 7—7 of FIG. 2 and shows the flow into the combustion chamber when the control valve is in the position as shown in FIG. 2.

Therefore, the control valve elements 94 are provided with a further flow-controlling recess 99 that has a generally large inlet portion that is generally complementary to the manifold runners 78 and valve body inlet portion 87, but which tapers and curves to a discharge end 101 which is disposed on one side of the valve body 94 and disposed so as to direct the air flow as shown in FIG. 7 when in its second extreme position primarily toward the center intake valve seat 42 and one side intake valve seat 43.

There will be some limited flow through a clearance area 102 also toward the other side intake valve seat 43. However, the resulting air flow into the cylinder is such as it will pass in the direction indicated by the arrow 102 in FIGS. 2 and 7 so as to generate both a swirl around the combustion chamber configuration and also a tumble action into the cylinders. This tumble action is caused because of the fact that the side intake passage 43 has the flow through it directed toward the side adjacent the plane containing the cylinder bore axis 41 so that there will be more flow on one side than the other, as shown in FIG. 2. In addition, the flow through the center intake valve seat 42 is also so directed, and this will further promote the tumble action. This gives rise to a high rate of turbulence in the combustion chamber, and also the restricted flow area increases the velocity. Thus, there will be good combustion and rapid flame propagation that will result in significantly improved performance.

The control valve 93 is operated by means of a servomotor 103 (FIG. 7) that is mounted at one end of the respective cylinder head 34 and on which a gear 104 is supported. The gear 104 is enmeshed with a gear 105 that is formed on a portion 106 of the control valve shaft 93 at this end of the engine so as to permit servo control of the control valve. The control may be as described in the aforenoted copending application, Ser. No. 08/363,746.

The control valve body 84 is provided with a plurality of fuel injector receiving ports 107 which are disposed in generally parallel relationship along the side of their flow passages 87. Fuel injectors 108 are mounted with their discharge nozzles in registry with these passages 107 by a mounting assembly 109. A fuel rail 111 supplies fuel to the fuel injectors 108.

Figure 8:
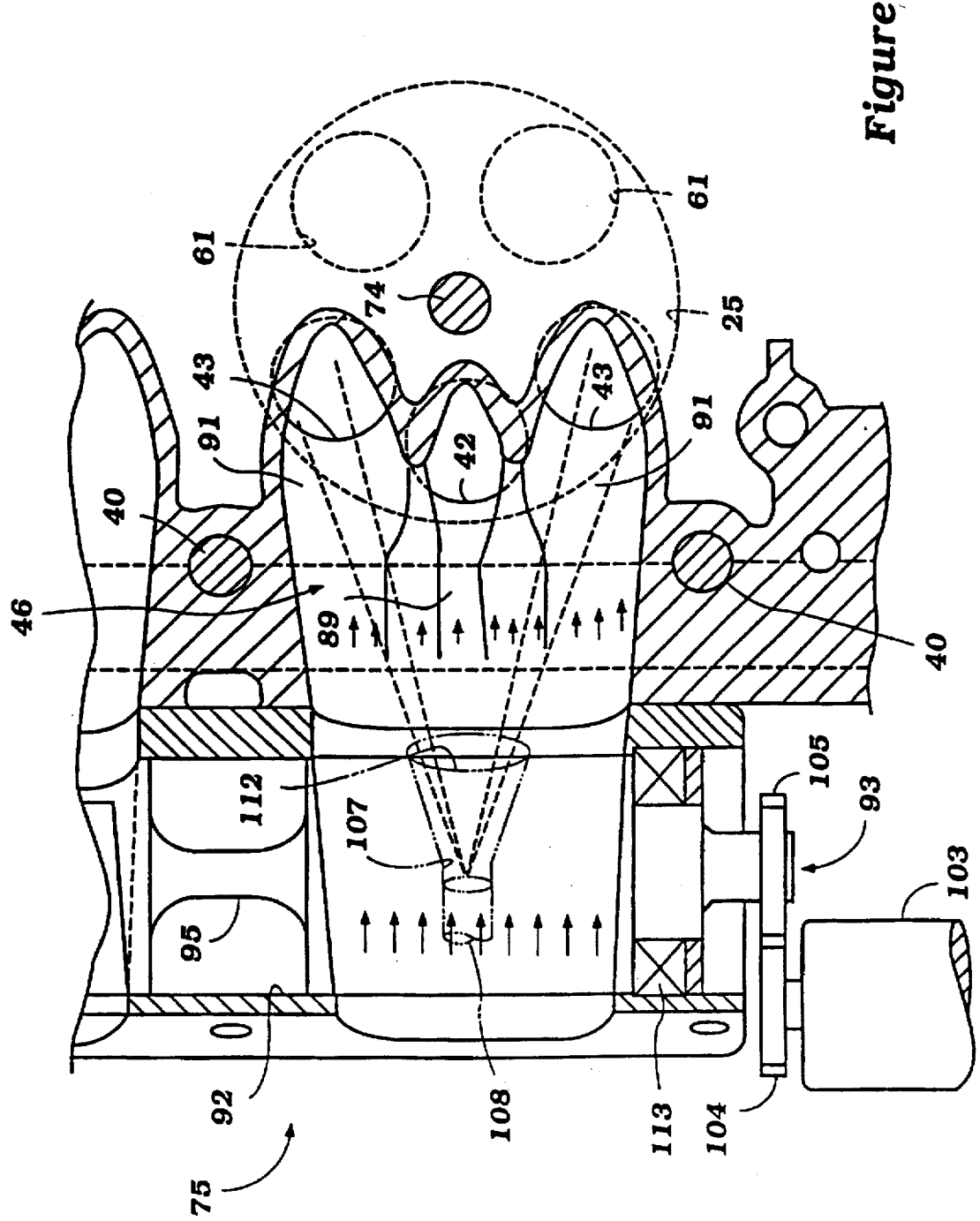
FIG. 8 is a view, in part similar to FIG. 7, and shows the flow when the control valve is in the position shown in FIG. 3.
Figure 9:
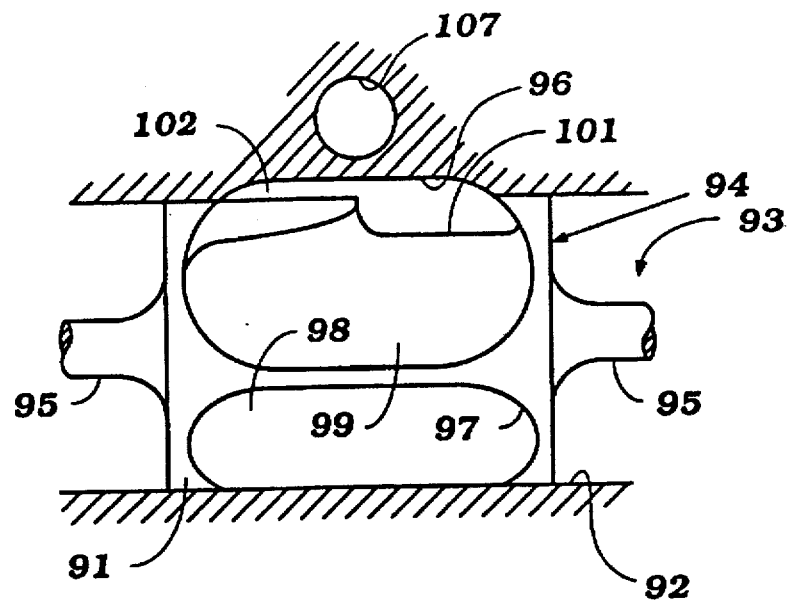
FIG. 9 is a view looking in the direction of the intake passage and shows the control valve in its first position.

In this embodiment, the passages 107 are generally flared outwardly so as to have relatively large outlet openings 112 so that the fuel sprayed therefrom will be directed to all of the intake valve seats 42 and 43 through their respective induction passage sections 89 and 91, as shown in FIGS. 7 and 8.

The ends of the control valve 93 are provided with cylindrical portions that are journalled in the valve body 84 by means of a pair of spaced-apart anti-friction bearings 113 and associated seals. The manifold runners 78 and valve body 84 are affixed to the cylinder head assemblies 54 by threaded fasteners 114 which pass either at the ends of the cylinder head or in the area of the reduced diameter interconnecting sections 95 of the control valve 93.

FIG. 6 shows another embodiment of the invention wherein the individual valving segments 94, rather than being integrally connected to each other, are connected by means of a tongue and groove connection, indicated generally by the reference numeral 151. A pair of bearings 152 are disposed at opposite ends of this tongue and groove connection 151 and provide gas sealing and rotary support. This connection will permit some thermal expansion of the cylinder head 34 and valve body 84 relative to the control valve elements 94.

Figure 13:
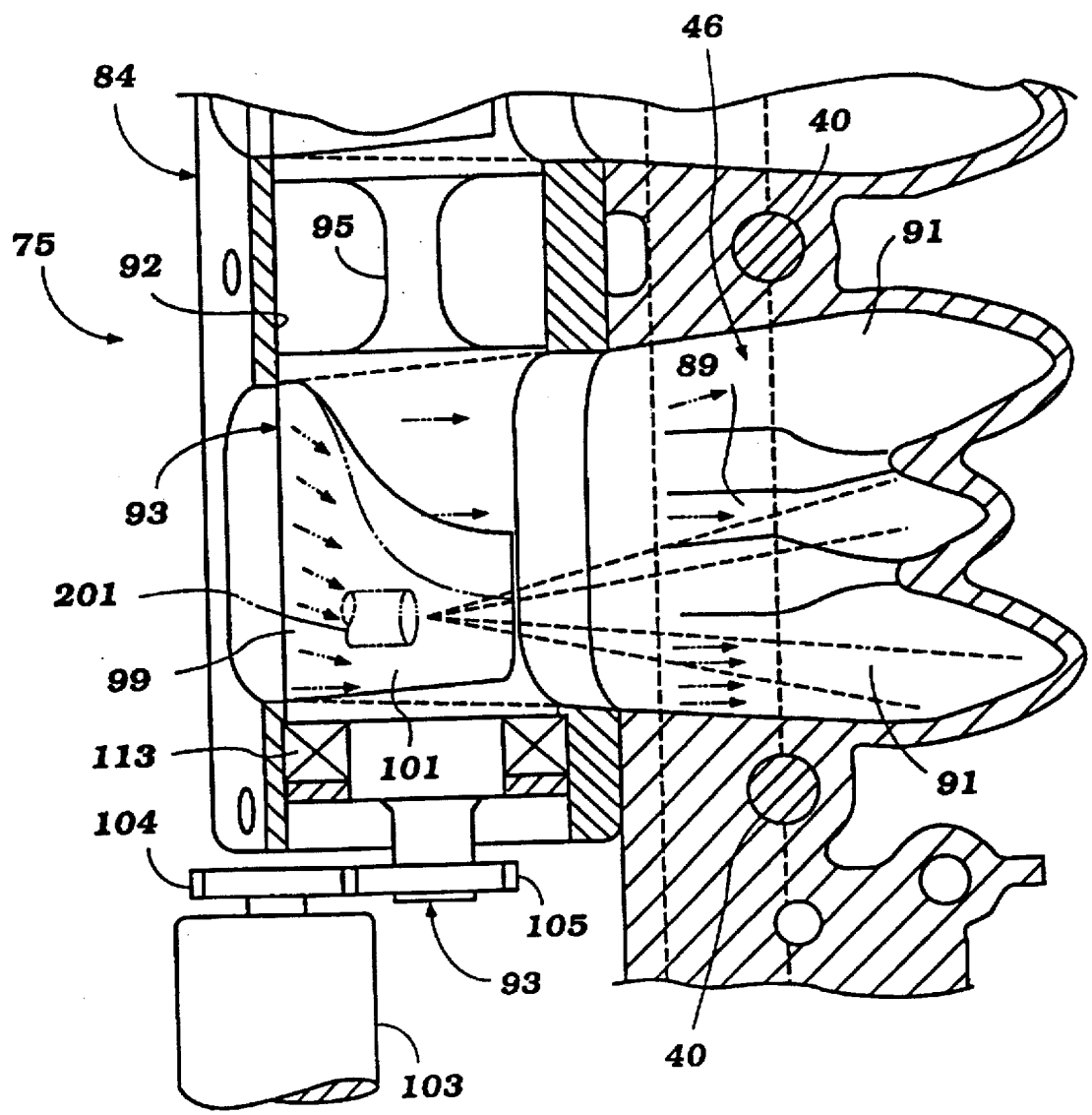
FIG. 13 is a view, in part similar to FIG. 7, and shows another embodiment of the invention, with the flow control valve in the corresponding position for this embodiment.
Figure 14:
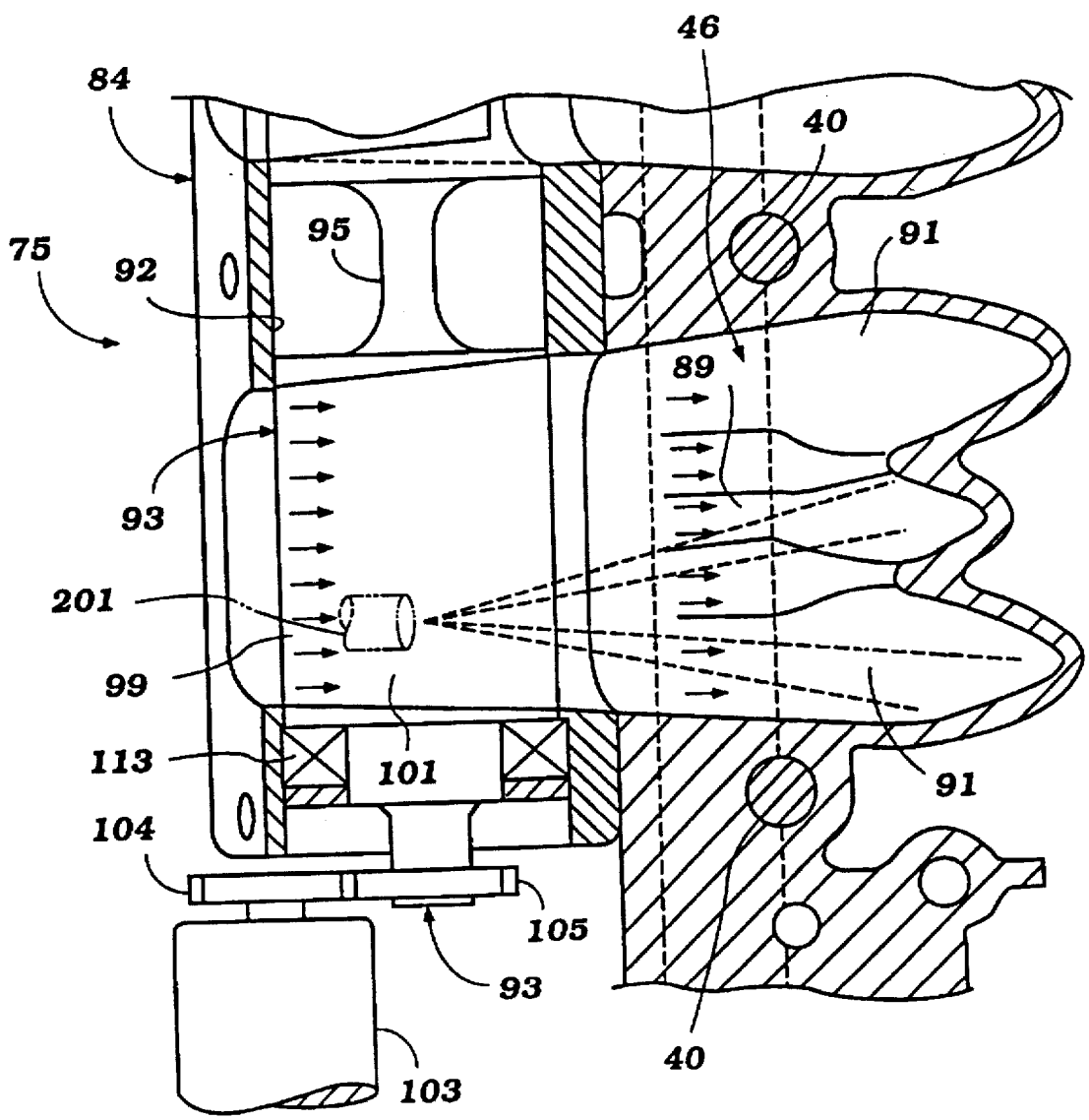
FIG. 14 is a view, in part similar to FIG. 8, and shows the control valve of the embodiment of FIG. 13 in the similar position.

FIGS. 13 and 14 show another embodiment of the invention which is generally the same as the embodiment of FIGS.

1–12. Because of this, only two figures, those corresponding to FIGS. 7 and 8, are believed necessary to understand the construction and operation of this embodiment. This embodiment differs from that previously described in that the fuel injector discharge recess, indicated by the reference numeral 201, is offset toward the side of the cylinder in which the air flow passes primarily when the control valve 93 is positioned in the low-speed turbulence-generating position. As a result, the fuel mixture will be delivered primarily to the one side intake valve seat 43 and the center intake valve seat 42, as shown in FIGS. 13 and 14, regardless of the position of the control valve 93. Even though the mixture strength is greater on one side of the cylinder when inducted, a homogeneous mixture will result under high-speed, high-load performance. Aside from this difference, this embodiment is the same and operates the same as that previously described, and for this reason, further description of the construction of this embodiment is not believed to be necessary to enable those skilled in the art to practice the invention.

Figure 15:
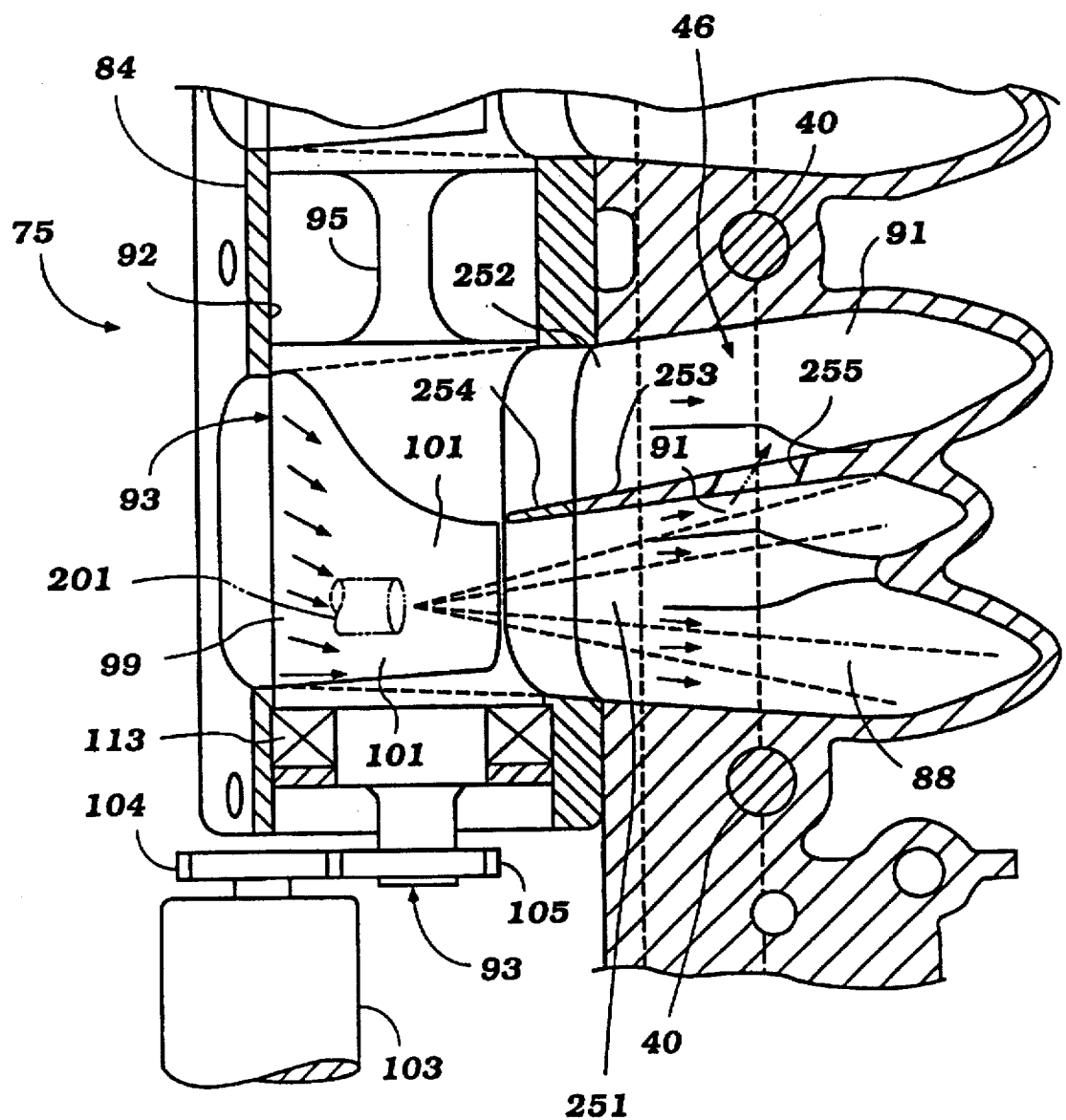
FIG. 15 is a cross-sectional view, in part similar to FIGS. 7 and 13, and shows a still further embodiment of the invention.
Figure 16:
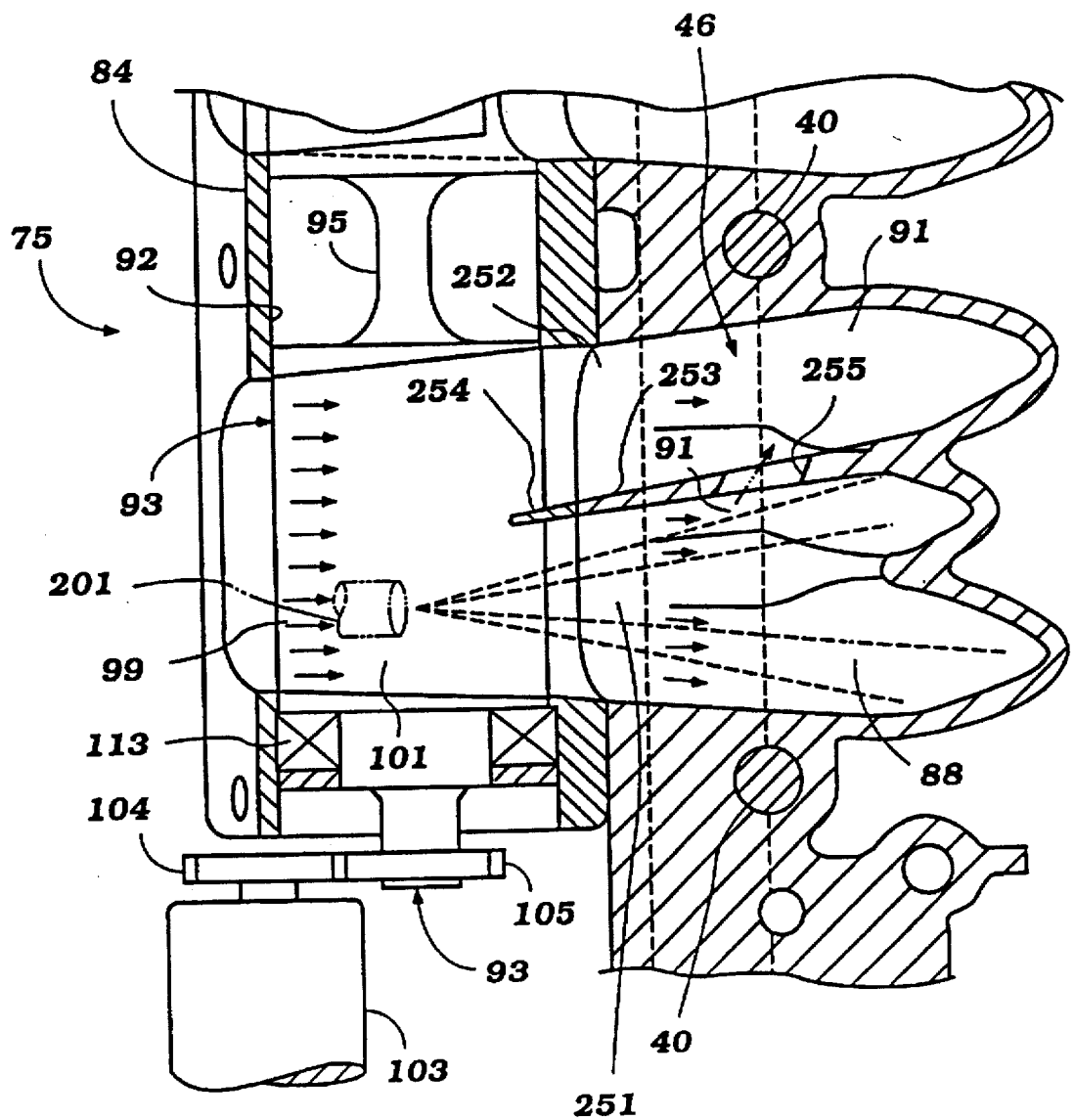
FIG. 16 is a cross-sectional view of this embodiment showing the control valve in its second position.

In all of the embodiments as thus far described, the intake passage 46 of the cylinder head has been substantially open up until the area immediately adjacent the valve seats 42 and 43. FIGS. 15 and 16 show another embodiment of the invention wherein the passages to which the flow is directed when the control valve 93 is in its low-speed, low-load condition are somewhat isolated from the remaining passage. In this embodiment, it should be noted that the cylinder head intake passage 46 is divided into a first portion 251 and a second portion 252 by an integral wall 253 of the cylinder head 34. The wall 253 has a further portion 254 that extends into and is formed by the control valve body 84 and which is disposed so as to be aligned with one side of the restricted portion 101 of the control valve 93 when in its low-speed, low-load condition.

Thus, the primary portion of the air charge will be delivered to the center intake valve seat and the side intake valve seat through the passages 88 and 91. However, some flow is also permitted to the remaining side intake valve passage 91 through a flow-directing opening 255 that is formed in the wall 253 and which is inclined from its inlet end to its outlet end toward the remaining side intake passage 91, as seen best in FIGS. 15 and 16. This arrangement employs the offset positioning of the fuel injector opening 201 as with the embodiments of FIGS. 13 and 14. It is to be understood, however, that a central fuel injector placement as with the embodiment of FIGS. 1–12 could also be employed in conjunction with this embodiment.

In the embodiments as thus far described, the control valve assembly 75 has the function when in its closed low-speed, low-load condition so as to restrict the flow through one of the side intake valve seats. As has been noted, this promotes both tumble and swirl. FIGS. 17–20 show another embodiment of the invention which employs a cylinder head porting configuration as shown in FIGS. 1–12, but which employs a control valve that has its valving portions 301 configured so as to primarily restrict the flow to the center intake valve seat 42 under these low-speed, low-load conditions and promote a greater flow through the side intake valve seats 43 and redirect this flow. This action will increase the amount of tumble that is generated and reduce or eliminate the amount of swirl from that of the previously described embodiments. Since the only difference between this embodiment and that of FIGS. 1–12 is in the configuration of the valve control elements 301, all other components have been identified by the same reference numerals and will not be described again, except insofar as is necessary to understand the construction and operation of this embodiment.

Figure 18:
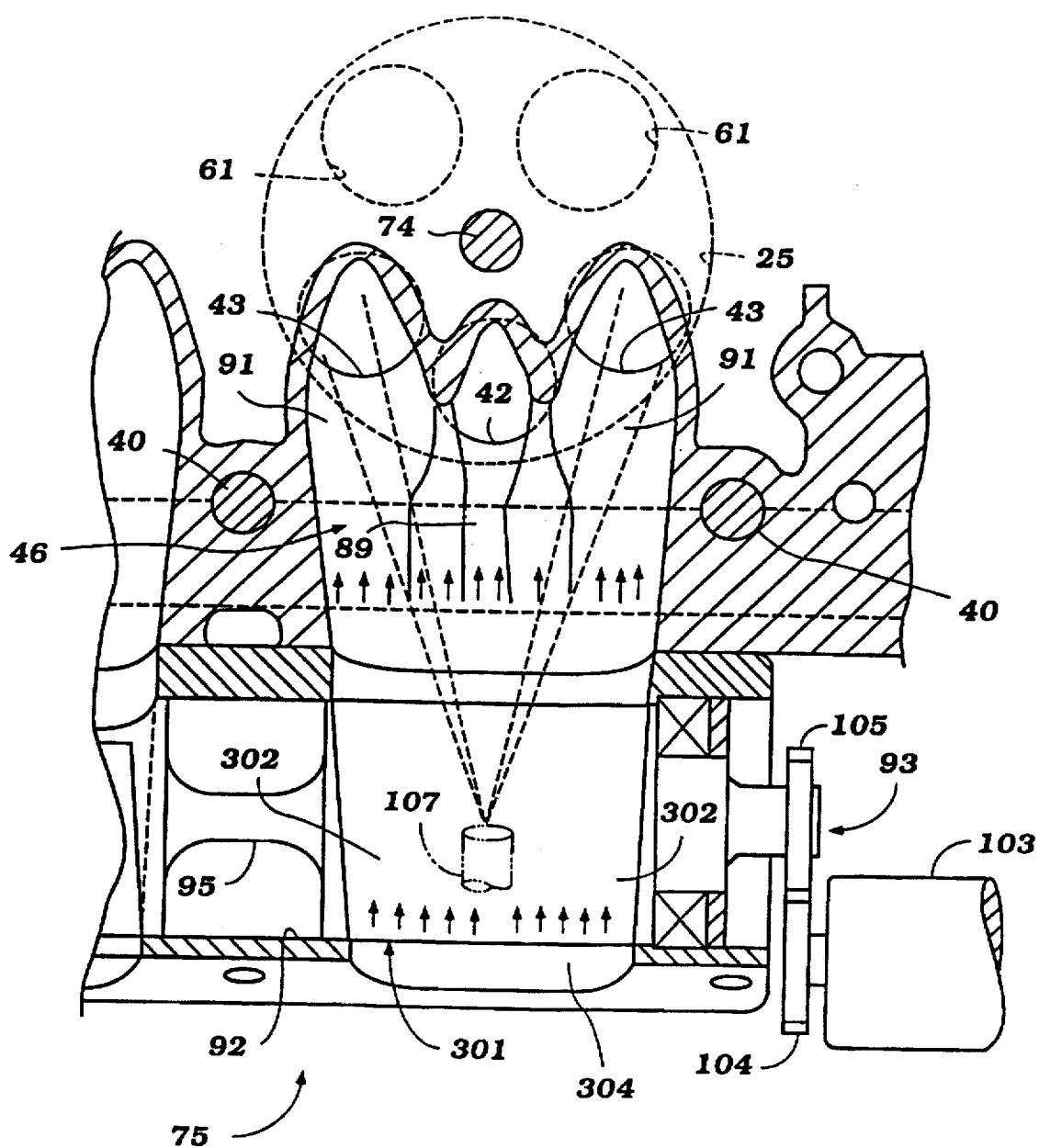
FIG. 18 is a cross-sectional view, in part similar to FIGS. 8, 14, and 16, showing the control valve of this embodiment in the corresponding second position.
Figure 20:
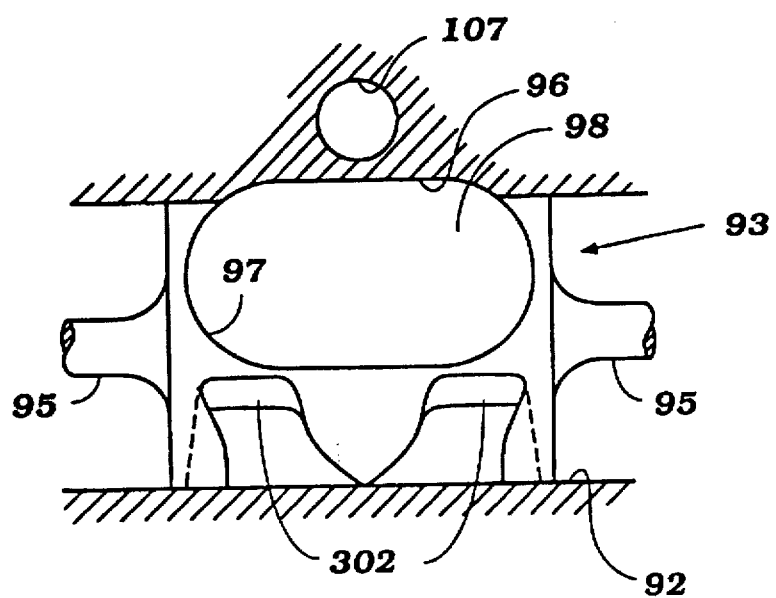
FIG. 20 is a cross-sectional view, in part similar to FIG. 19, and shows this control valve element in its second position.

In this embodiment, the valve elements 301 have a generally cylindrical configuration and have a first cutout 97 which cooperates with the valve body recess 96 so as to provide an unobstructed flow passage 98 when the valve is in the position shown in FIGS. 18 and 20. In this regard, this embodiment is also the same as that previously described, and hence the same reference numerals have been applied.

Figure 17:
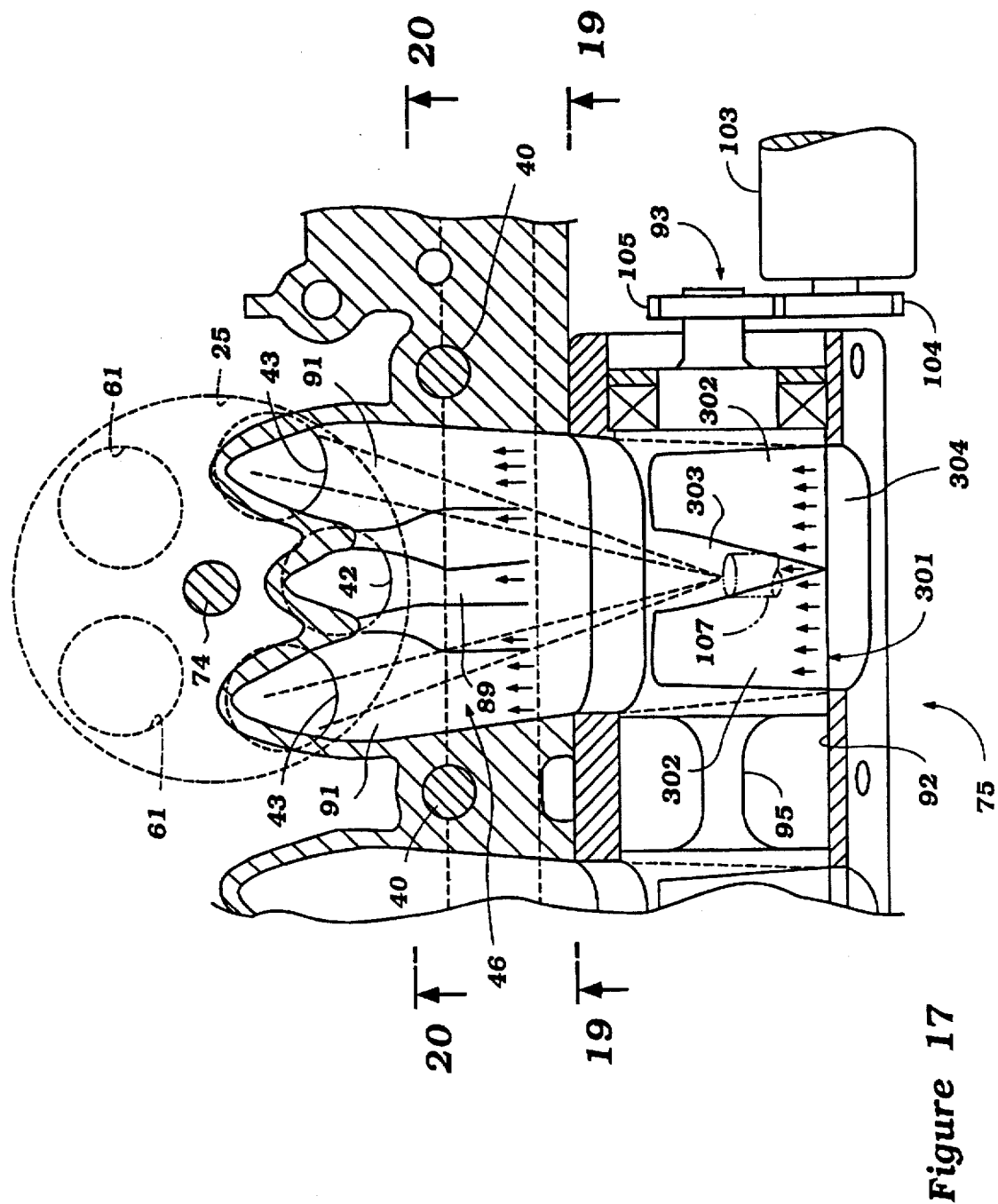
FIG. 17 is a cross-sectional view, in part similar to FIGS. 7, 13, and 15, and shows another control valve embodiment in the same first position.
Figure 19:
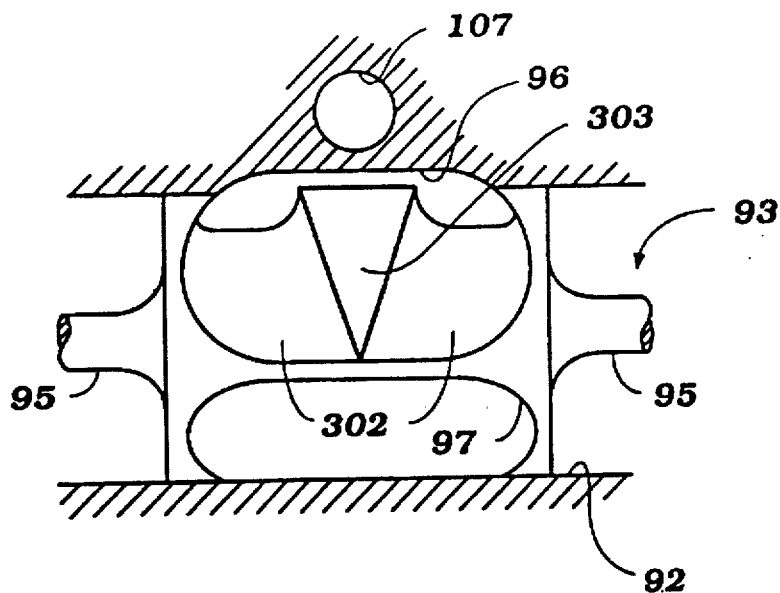
FIG. 19 is a view, in part similar to FIG. 9, but shows the control valve of the embodiment of FIGS. 16–18.

In this embodiment, however, the shape of the valve element 301 in its other position is defined by a pair of flow-directing portions 302, which are divided by a wall 303 and which extend from a common inlet opening 304 which registers with the manifold runners 78 when in the position shown in FIGS. 17 and 19. The upstanding wall 303 will, however, in this position substantially obstruct any flow through the cylinder head passage portion 89 to the center intake valve seat 42 and direct substantially all of the flow to the side intake valve seat portions 91. Thus, substantially all of the flow will pass to the cylinder through the side intake valve seats 43. As with the previously described embodiment, this configuration is also such that the flow will be directed primarily toward the sides of the valve seats 43 closest to the cylinder bore axis 41, and hence primarily a tumble action will be generated. This tumble action will be accompanied by little swirl in this embodiment, since the flow is generally symmetric into the combustion chamber.

Figure 21:
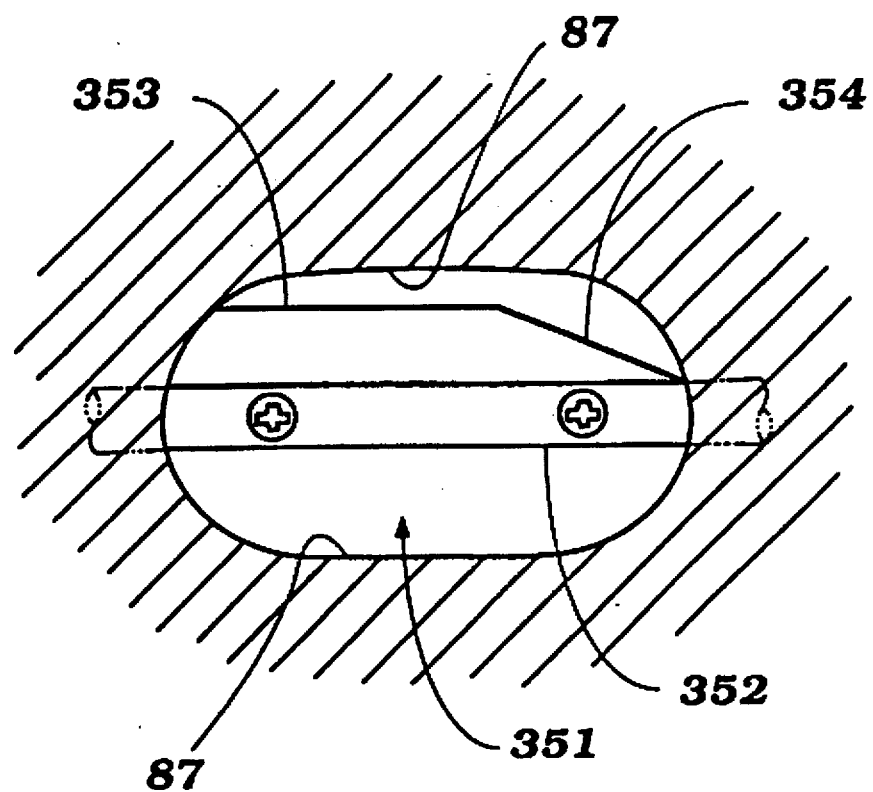
FIG. 21 is a cross-sectional view, in part similar to FIGS. 9 and 19, and shows plate-type control valve element.
Figure 22:
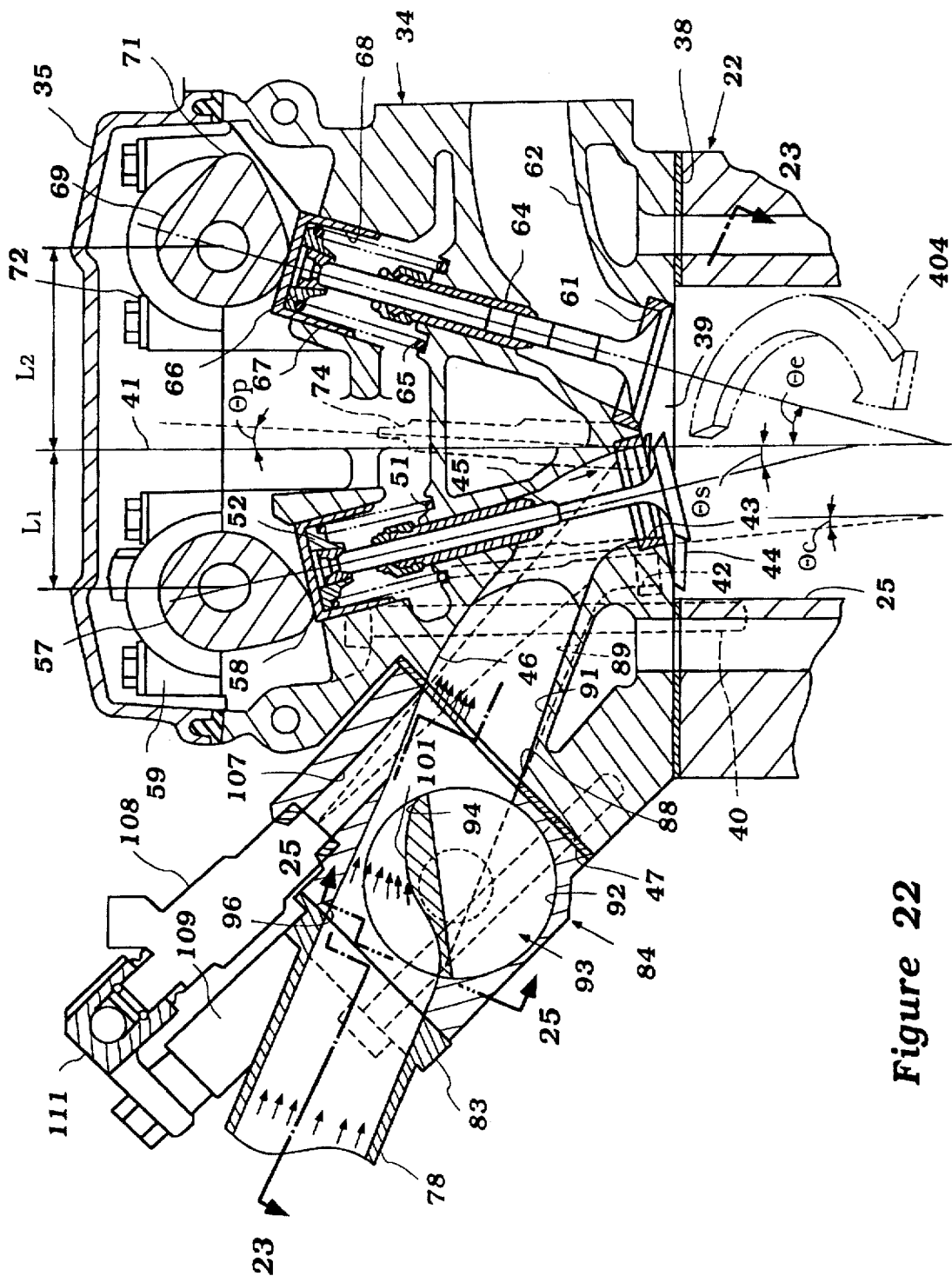
FIG. 22 is a cross-sectional view, in part similar to FIG. 1, and shows another embodiment of the invention with the control valve in its flow controlling low-speed, low-load condition.

In all of the embodiments as thus far described, the control valve has embodied a cylindrical valve element having a configured outer surface. FIG. 21 shows an embodiment wherein the valve element is of the plate type, and the valve element is indicated in this figure by the reference numeral 351. There is provided a valve element 351 for each control valve body passage 87, and these are all affixed on a common control valve shaft 352 that is driven in the manner previously described. The control valve element 351 is of the butterfly type and has along one edge a cutout 353 that terminates adjacent one of the side intake valve seats 42 in a tapered portion 354. As a result, the flow will be directed into the cylinder similar to that of the embodiment of FIGS. 1–12 when the valve element 351 is in its closed position. Hence, a swirl and tumble will be generated. When the valve element 351 is opened, however, there will be no flow resistance, and the normal flow will result.

In the embodiments of the invention as thus far described, when the flow controlling control valve has been positioned in its low-speed, low-load condition, the flow to primarily one of the intake valve seats has been substantially restricted and the flow has been directed primarily to the remaining intake valve seats. In some instances it may be desirable to restrict the flow to two of the intake valve seats in a three-intake-valve arrangement so that the flow primarily flows into the combustion chamber through one of the intake valve seats. If this is done and that one intake valve seat is a side intake valve seat, then turbulence can be substantially increased; and both swirl and tumble, creating an action which may be referred to as slant tumble, can be achieved. Next will be described a number of embodiments wherein this type of flow arrangement is accomplished.

The first of these embodiments is illustrated in FIGS. 22–28 and is generally the same as the embodiment of FIGS. 1–12. In fact, this embodiment varies from that embodiment only in two regards. The first is the shape of the cutout of the flow control valve, and the other is the shape of the intake passage in the valve body and in the cylinder head 34.

Because of the fact that these are the only differences, the components of this embodiment which are the same or substantially the same have been identified by the same reference numerals and will not be described again, except insofar as it relates to these differences and the effect which they create.

Figure 23:
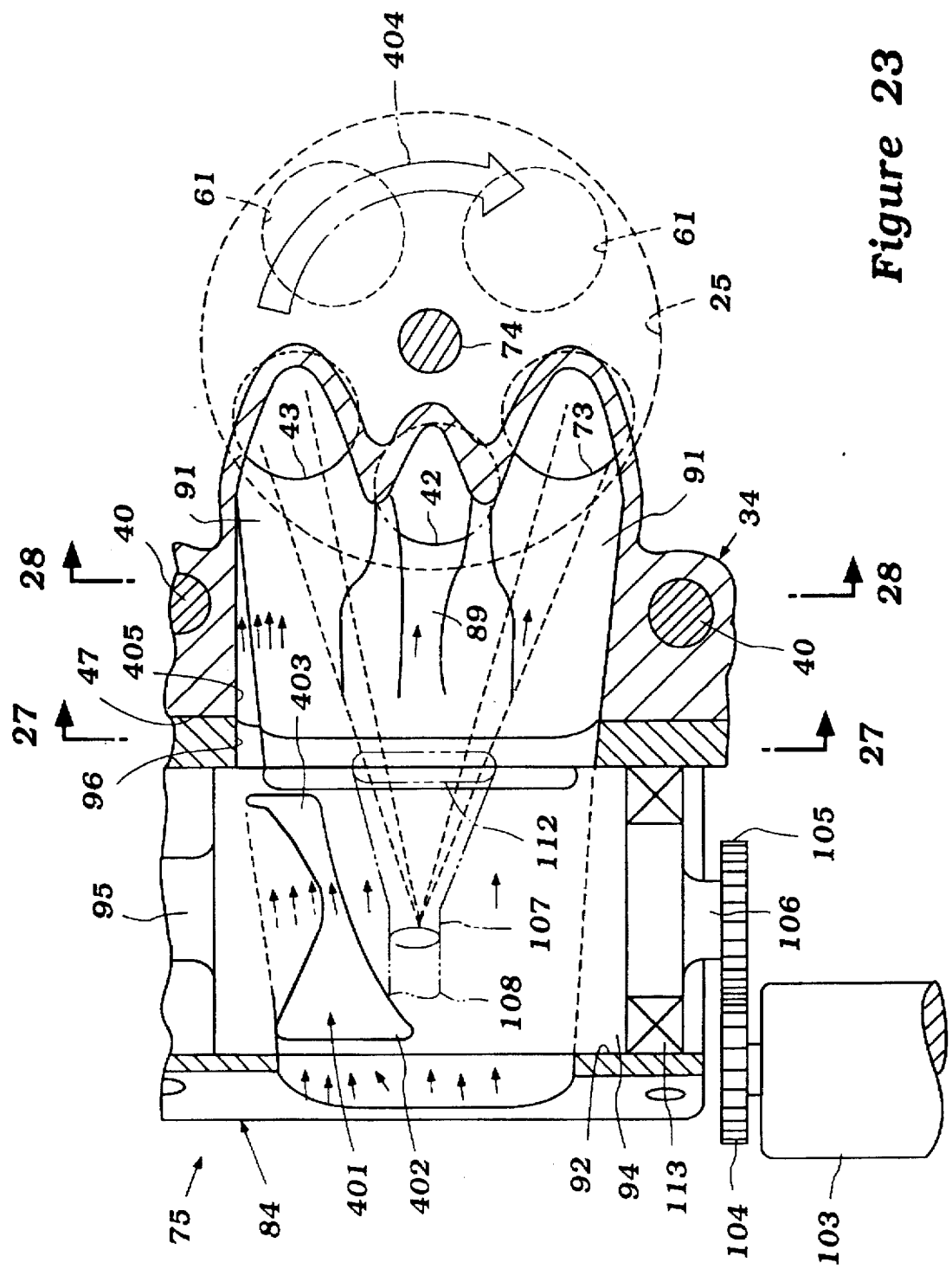
FIG. 23 is an enlarged cross-sectional view, in part similar to FIGS. 7, 13, 15, and 17, but taken along the line 23—23 of FIG. 22 and shows the low-speed, low-load condition in this embodiment.
Figure 24:
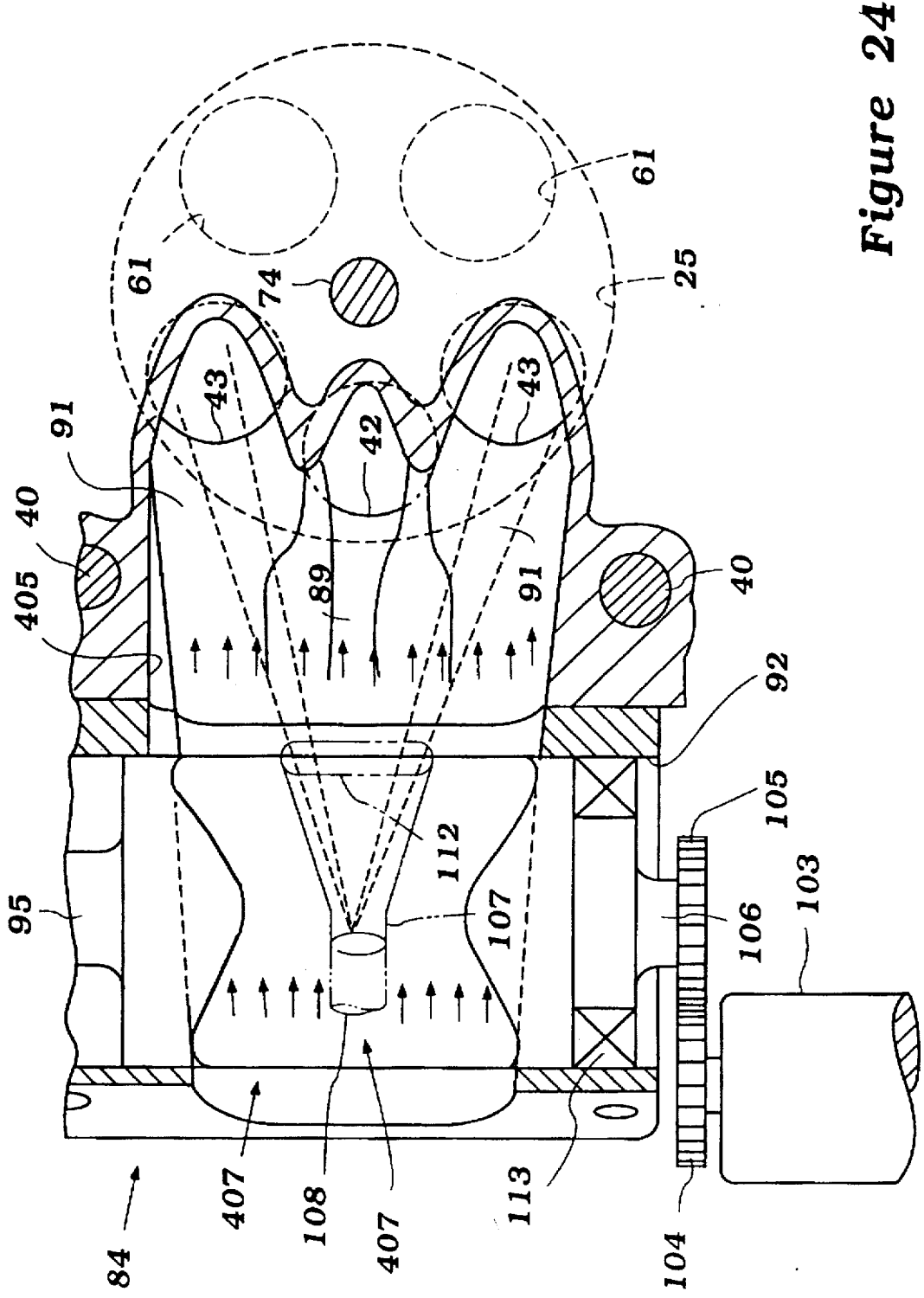
FIG. 24 is a cross-sectional view, in part similar to FIG. 23 and also to FIGS. 8, 14, 16, and 18, and shows the high-speed, high-load air flow pattern for this embodiment and the control valve in that position.
Figure 25:
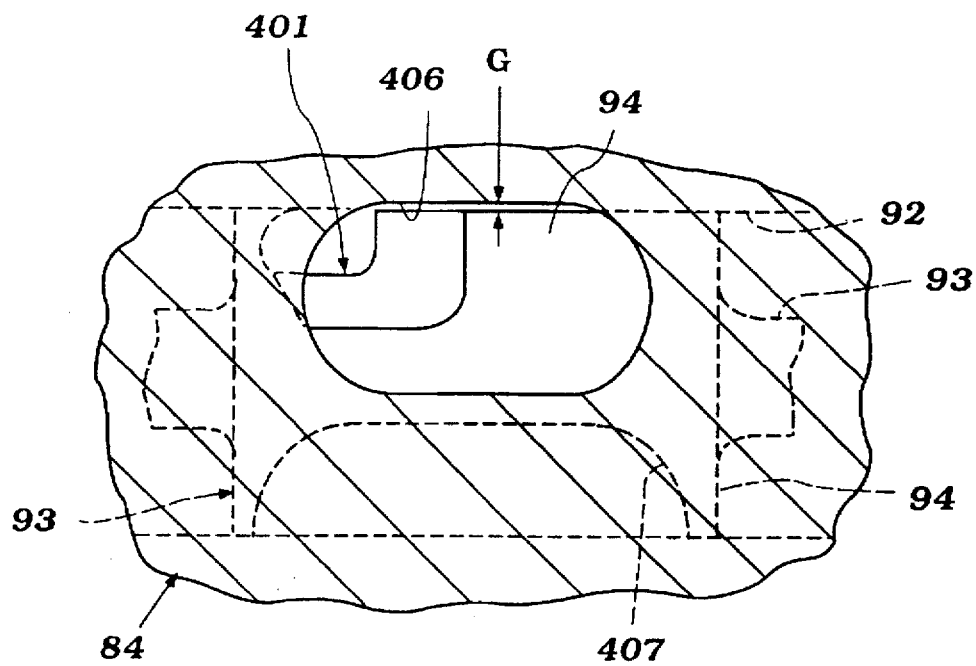
FIG. 25 is a cross-sectional view, in part similar to FIGS. 9 and 19, but taken along the line 25—25 of FIG. 23 and shows the control valve of this embodiment in its low-speed, low-load condition.

As best seen in FIGS. 23–26, the body 94 of the control valve 93 is provided with a first slot or cutout, indicated generally by the reference numeral 401, which has a generally tapered configuration starting out with a wide inlet end 402 that tapers to a throat and then expands and terminates in a discharge end 403 that is directed at an angle so that the air flow when the valve 93 is in its closed low-speed condition, as shown in FIGS. 23 and 25, will be directed primarily toward the one side intake passage 91 that serves one of the side intake valve seats 43. Hence, the intake charge that is inducted will flow primarily in the direction of the arrow 404, which appears in FIGS. 22 and 23, and creates both a tumble action and a swirling motion. As may be seen clearly in FIG. 25, the cutout 401 is disposed on the upper side of the valve member 94 when in this position so as to direct the charge primarily toward the side of the side intake valve seat 43 closest to the cylinder bore axis 41 so as to promote tumble. In addition, the side disposition creates a swirling motion.

To further assist in this action, the passageway 96 in the valve body 84 and the corresponding side wall of the cylinder head 34 which defines the intake passageway 46 are formed with a cut-out area 405 that is disposed on the upper side of the intake passage 91, and thus further direct and restrict the flow in this area so as to ensure a high velocity of the charge and flow in the desired direction.

It should also be noted that the outer diameter of the valve element 93, and specifically the valving portion 94, is configured so as to provide a small gap G from the upper surface 406 of the valve body passage 96 so as to permit some flow, as shown by the arrows in FIG. 23 through the remaining valve seats 42 and 43.

Figure 26:
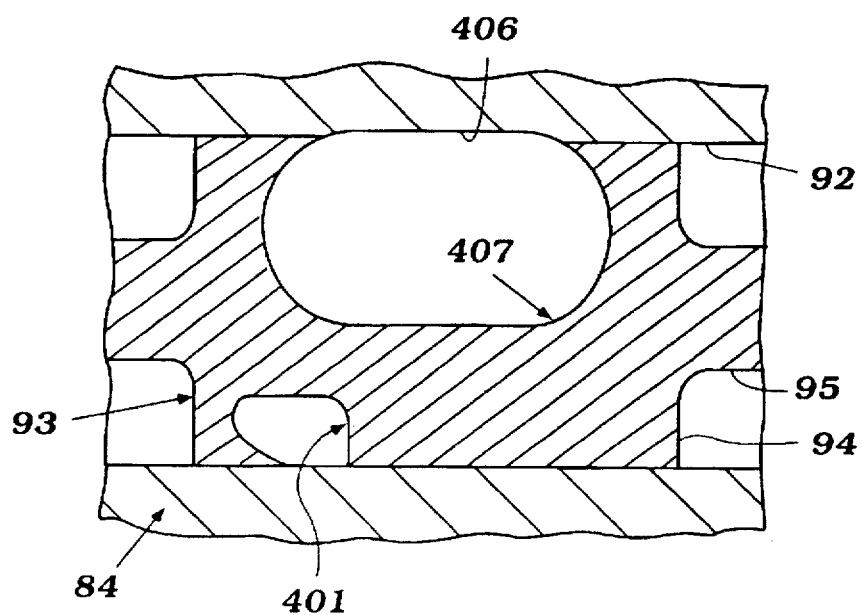
FIG. 26 is a cross-sectional view, in part similar to FIG. 25 and also to FIGS. 10 and 20, and shows the control valve of this embodiment in its high-speed, high-load condition.
Figure 27:
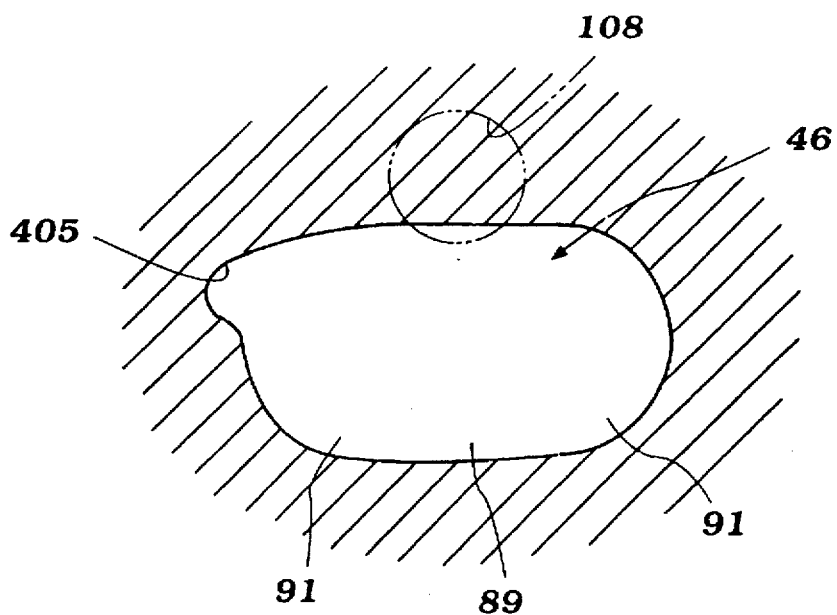
FIG. 27 is a cross-sectional view taken along the line 27—27 of FIG. 23.
Figure 28:
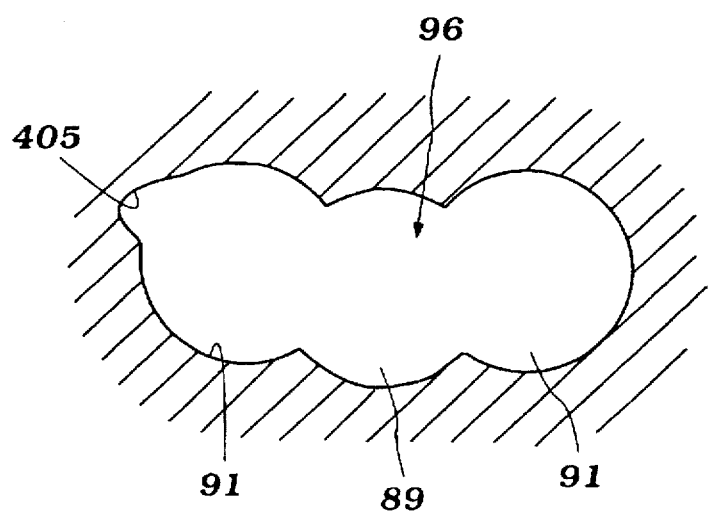
FIG. 28 is a cross-sectional view taken along the line 28—28 of FIG. 23.
Figure 29:
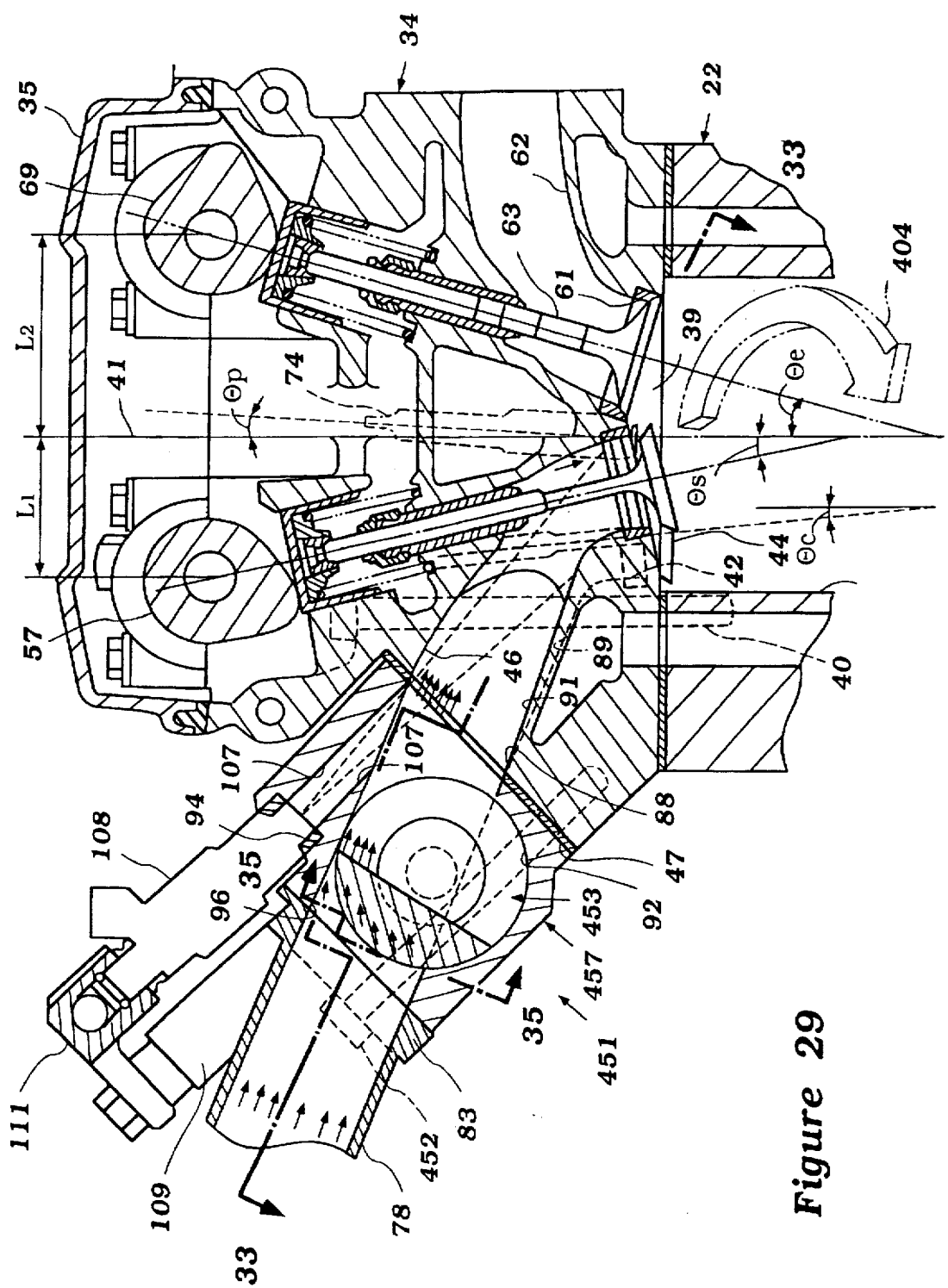
FIG. 29 is a cross-sectional view, in part similar to FIGS. 2 and 22, and shows still another embodiment of the invention with the flow controlling valve in its low-speed, low-load condition.
Figure 30:
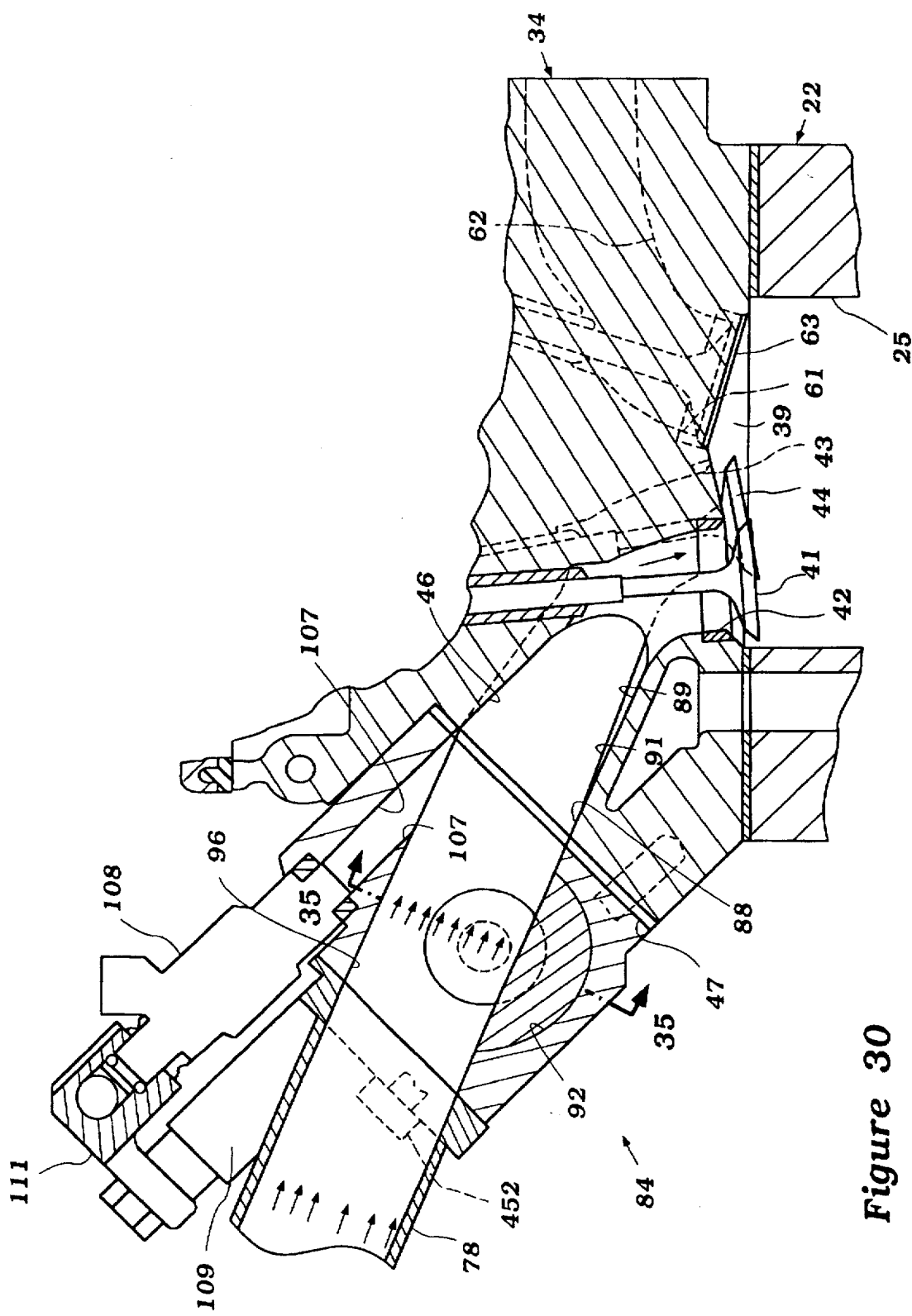
FIG. 30 is a partial cross-sectional view, in part similar to FIG. 29, and shows the flow control valve in its open, high-speed, high-load condition.
Figure 31:
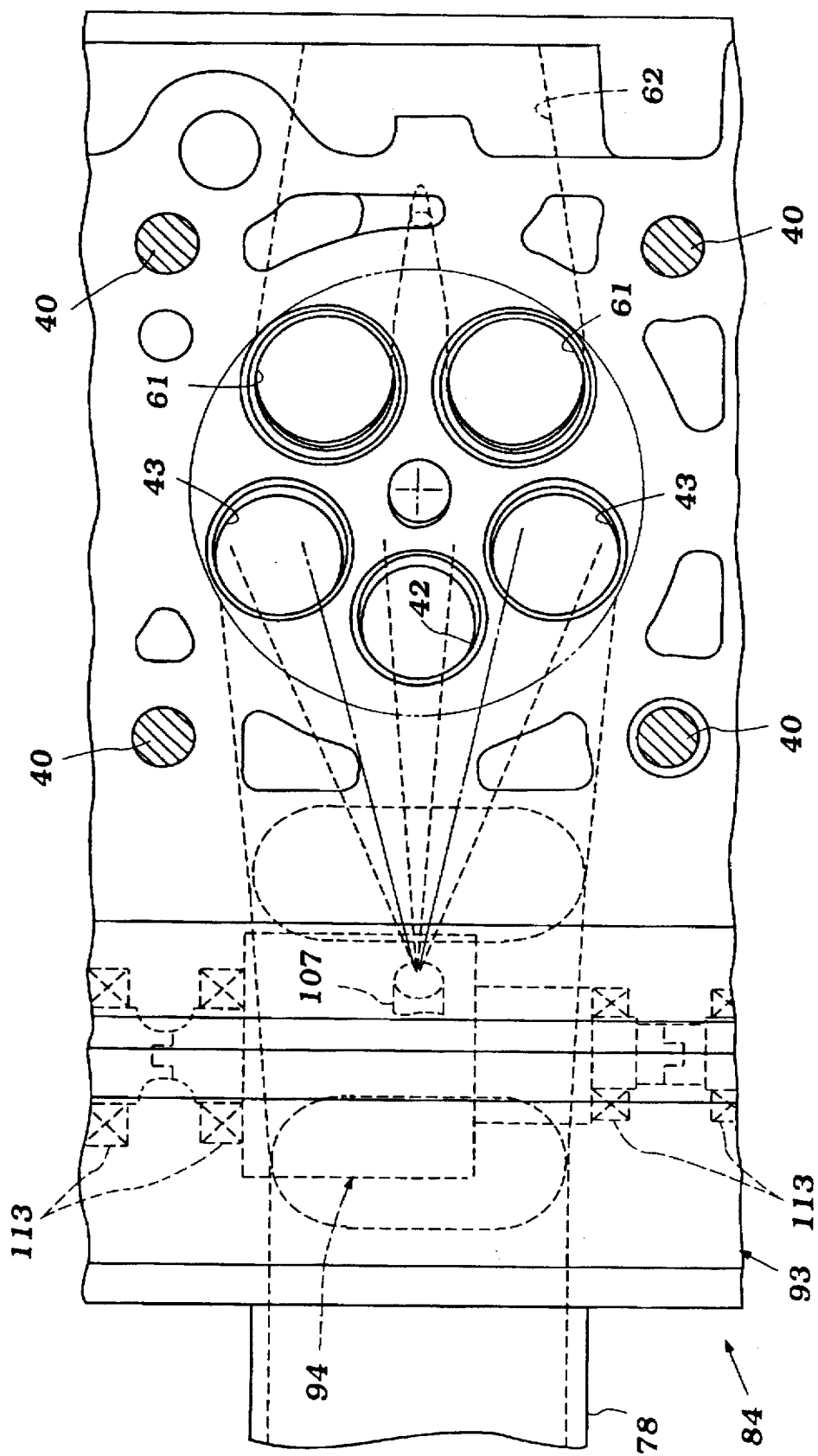
FIG. 31 is a bottom plan view of the cylinder head and valve assembly of this embodiment with the intake valves removed.
Figure 32:
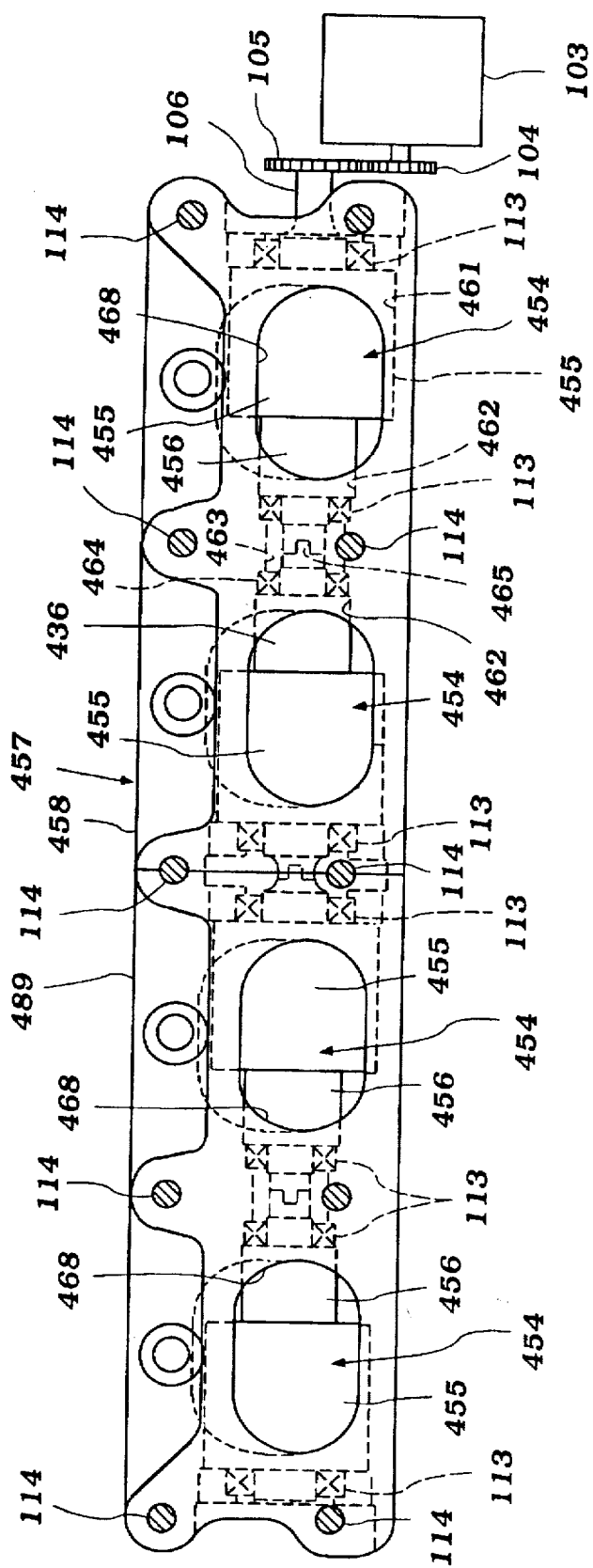
FIG. 32 is a view looking in the direction of the control valve assembly of this embodiment.

When in its open high-speed flow condition, as seen in FIGS. 24 and 26, a further slotted portion 407 in the outer periphery of the valving member portion 94 will be in registry with the flow passage 96 of the valve body 84, and the flow will enter the combustion chamber and cylinder head intake passage 46 in a substantially unrestricted form, as shown by the arrows in FIG. 24. This promotes high volumetric efficiency and permit the attainment of large power outputs as with the earlier described embodiments.

FIGS. 29–36 show another embodiment of the invention which is generally the same as the embodiment of FIGS. 22–28 in function. That is, this embodiment, like that embodiment, is constructed so that under the low-speed, low-load condition, the bulk of the air charge will be inducted through one of the side intake valve seats 43. There will be only restricted flow permitted through the remaining valve seats, including the other side valve seat 43 and the center intake valve seat 42.

However, the actual construction of the valve element is different, and because of this difference the control valve assembly is identified by a new reference numeral, the numeral 451, and all reference numerals applied to the valve assembly 451 will be new, even though some of the components are the same as or similar to those of the previously described embodiments. In addition, the installation of the control valve 451 is similar, and the fasteners which hold it in place are identified by the reference numeral 452. As will also become apparent, the actual assembly of the valve 451 is different for reasons which will become obvious.

In the embodiment of FIGS. 22–28 and some of the earlier embodiments, a generally cylindrical valve body or the valving element portions 94 have been employed. This results in the formation of a relatively large bore in the housing assembly and provides larger areas where leakage might occur. However, this has been utilized for ease of assembly, particularly where multiple cylinders are served by the same valve body.

In accordance with this embodiment, the actual valve element, indicated in these embodiments by the reference numeral 453, is constructed in a different manner so that it can be assembled more easily, permits the use of smaller bore diameters, and also facilitates machining of the actual valving surfaces. Like certain of the previously described embodiments, the actual control valve element 453 is made up of individual valving segments 454 that are connected to each other by a tongue and groove connection, as best seen in FIGS. 32–36. This tongue and groove connection will also be described in more detail later.

Each of the valving sections 454 is provided with a first, larger diameter portion 455 and a second, smaller diameter portion 456. The valve body, indicated generally by the reference numeral 457, is made up of two sections, 458 and 459. These two sections are affixed by the fasteners 452 between the cylinder head 34 and the flanges 83 of the manifold runners 78, and thus are fixed relative to each other.

The outer ends of each of the sections 458 and 459 are formed with large diameter counter bores 461, each of which receives a respective large-diameter portion 455 of the respecting valving element 454. Extending between these larger diameter bores 461 in each of the housing sections 458 and 459 is a smaller diameter bore 462. The smaller diameter portion 456 of each of the valve elements 454 is received in this smaller diameter bore 462. A still further bore 463 extends between the inner ends of the bores 462 and receives a pair of seals 464 for sealing the area at the adjacent ends 456 of the valve elements 454. The smaller diameter ends 456 of each of the valve elements 454 have a tongue and groove connection 465, like the previously described embodiments so as to accommodate thermal expansion and also so as to permit the simultaneous rotation of all of the valve elements 454.

Figure 33:
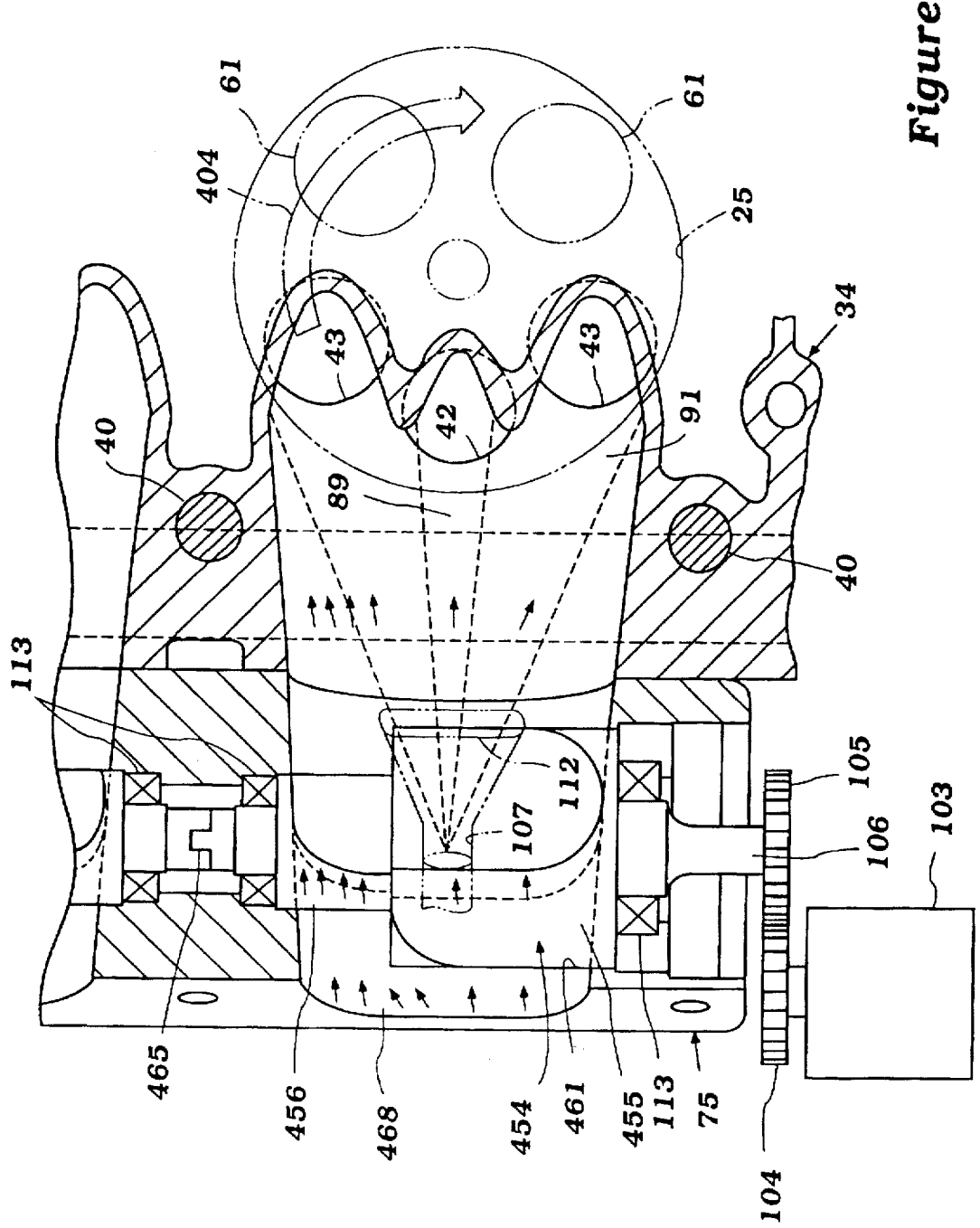
FIG. 33 is a cross-sectional view, in part similar to FIGS. 7, 13, 15, 17, and 23, taken along the line 33—33 of FIG. 29 and shows the low-speed, low-load flow pattern in this embodiment.
Figure 35:
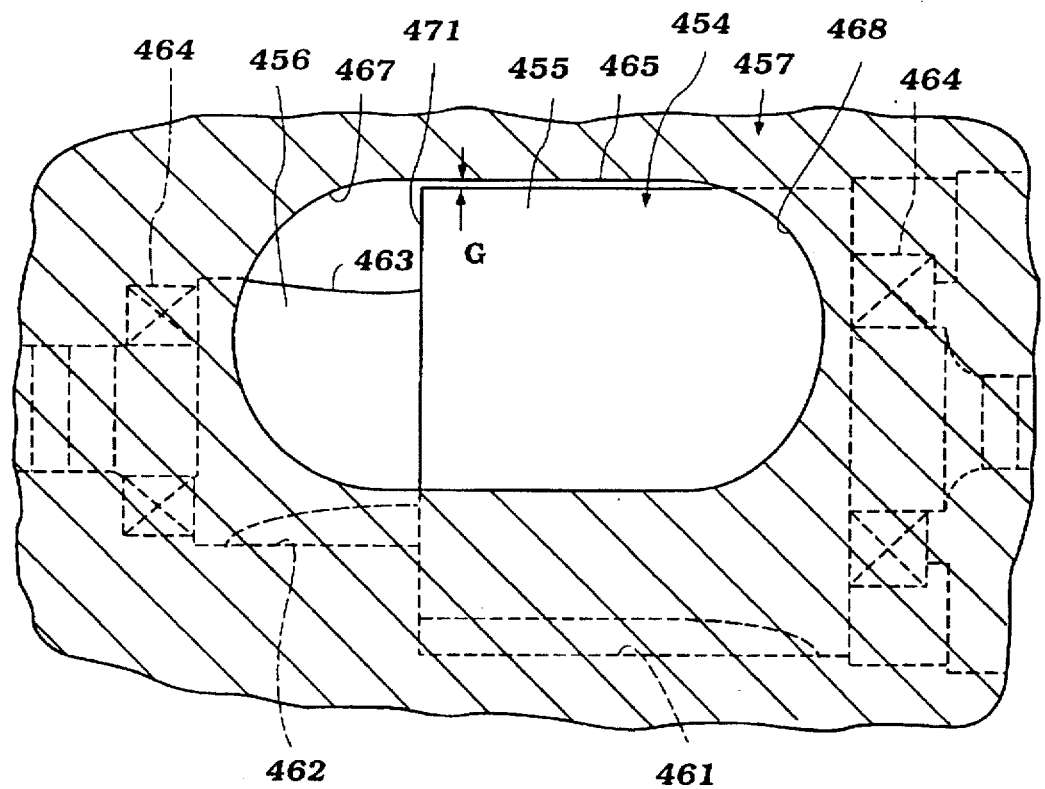
FIG. 35 is an enlarged cross-sectional view, in part similar to FIGS. 9, 19, 21, and 25, but taken along the line 35—35 of FIG. 30 and shows this embodiment and the position of the flow control valve under low-speed, low-load conditions.

When the valve elements 454 are in their flow restricting low-speed condition, as shown in FIGS. 33 and 35, the cylindrical outer periphery 466 of the valve element portion 455 will be spaced inwardly from the upper wall 467 of the flow opening 468 in the valve body 457 so as to define a small gap G where flow may occur to the center and one of the side intake valve seats 42 and 43, respectively. The smaller diameter valving portion 456 has a somewhat tapered configuration, indicated at 469, which, coupled with the end surface 471 of the larger diameter portion 455, defines a relatively narrow small window through which flow to the one side intake valve seat 43 may occur so as to generate the swirl and tumble action, as indicated by the arrow 404.

Figure 34:
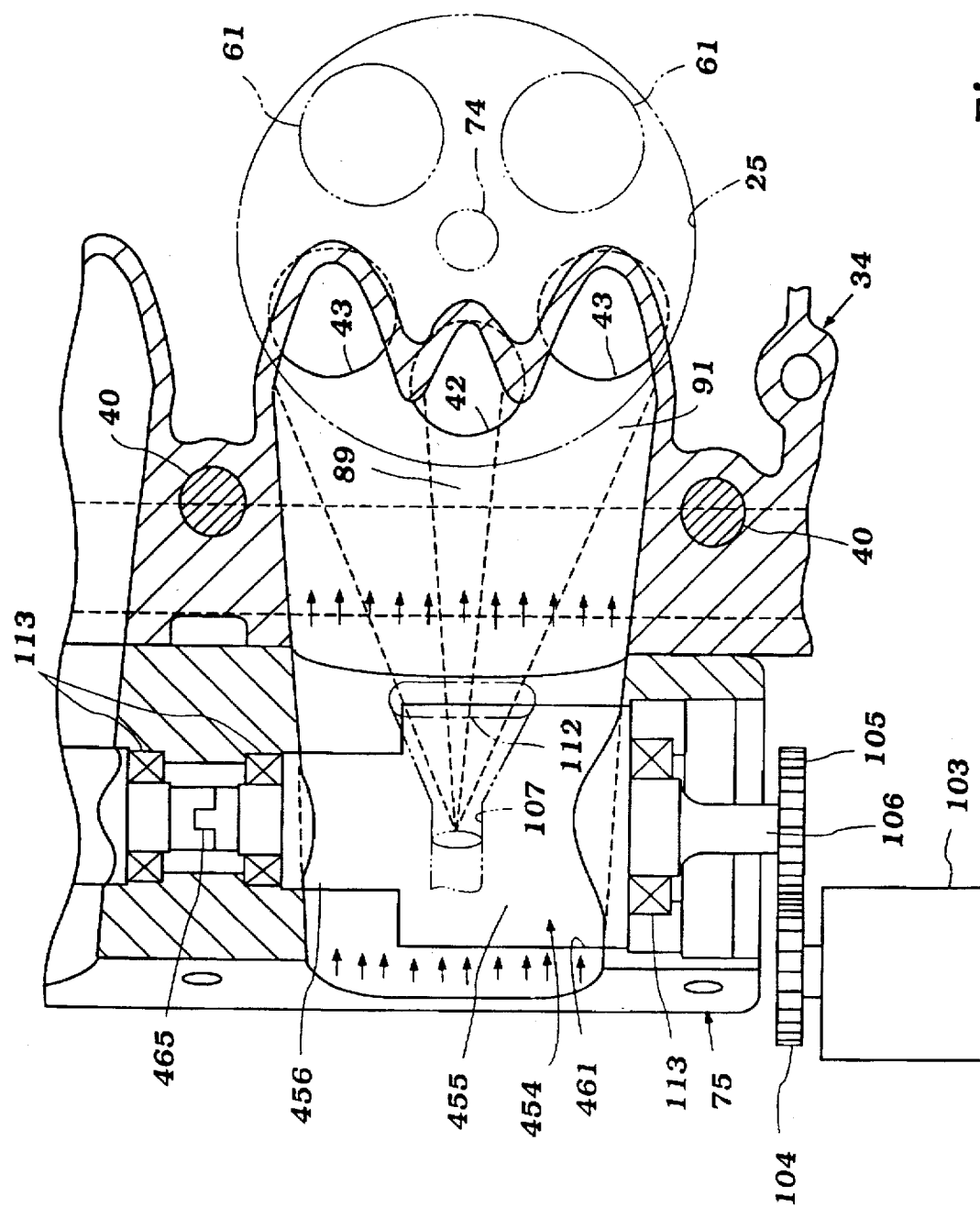
FIG. 34 is a cross-sectional view, in part similar to FIG. 33 and also similar to FIGS. 8, 14, 16, 18, and 24, and shows the high-speed, high-load valve condition and flow for this embodiment.
Figure 36:
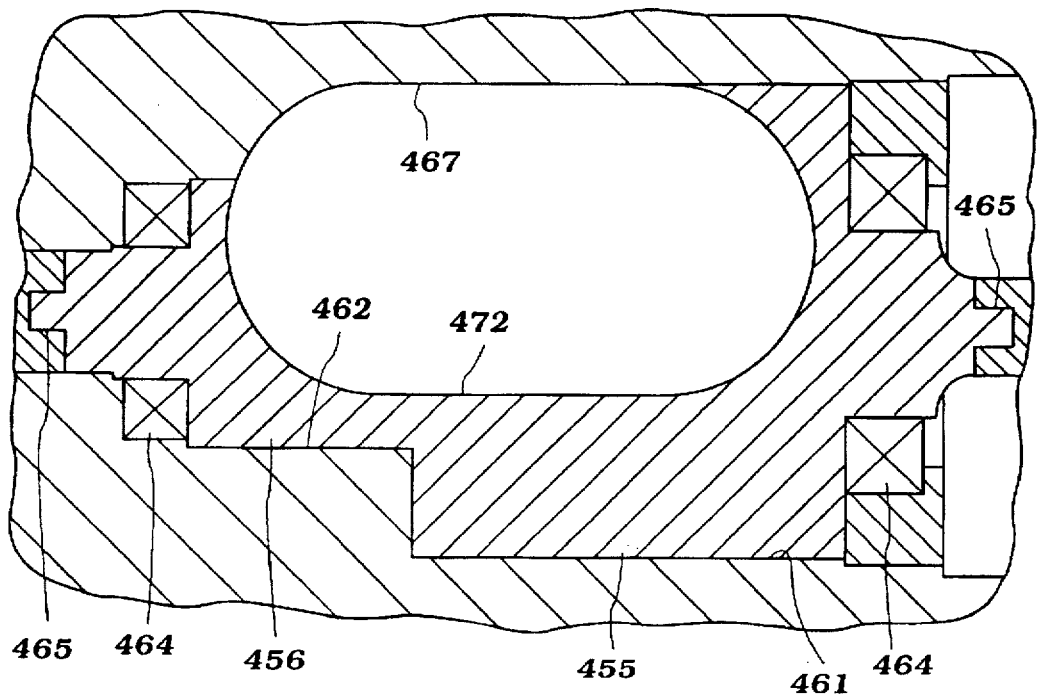
FIG. 36 is a cross-sectional view, in part similar to FIG. 35 and also in part similar to FIGS. 10, 20, and 26, and shows the flow control valve of this embodiment in its high-speed, high-load condition.

When the valve elements 454 are rotated to their fully opened, non-flow restricting position, as shown in FIGS. 34 and 36, a cutout 472 that extends through the valve element portions 455 and 456 will provide an open, unrestricted flow area that permits flow to the combustion chamber through each of the valve seats 42 and 43 so as to achieve maximum power output.

In all of the embodiments thus far described, the control valves of the various embodiments have been rotary valves.

This has been true with respect to not only the three-dimensional-type valves of all embodiments of FIG. 21, but also that particular butterfly-type control valve arrangement. In some instances it may be possible to employ control valves that are other than rotary or which rotate about axes that do not extend through and thus obstruct the flow passage in the intake system.

Figure 37:
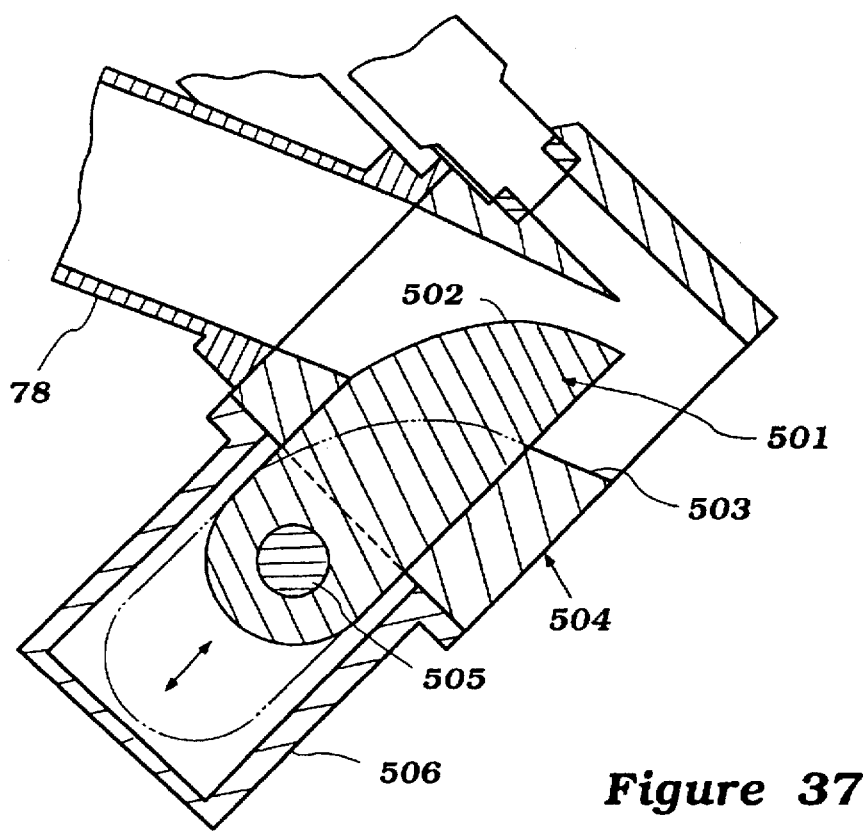
FIG. 37 is a partial cross-sectional view taken along a plane similar to that of FIGS. 2, 22, and 29 and shows another type of flow control valve.

FIG. 37 shows one such embodiment that employs a sliding-type flow control valve 501 that has a curved valving surface 502 which is complementary when in the non-flow restricting position (phantom line view) to a flow passage 503 of a valve body 504 which, like the previous embodiments, is interposed between the manifold runner 78 and the cylinder head 34. This valve element 501 is operated by an actuating shaft 505 that is slidably supported in a slot formed in a cover piece 506 of the housing assembly 504.

In flow-restricting flow redirecting direction (solid line view), the valve surface 502 protrudes into the passageway 503 and obstructs the flow to one or two of the valve seats and redirects the flow in the remaining valve seat so as to generate a swirl or tumble, or both.

Figure 38:
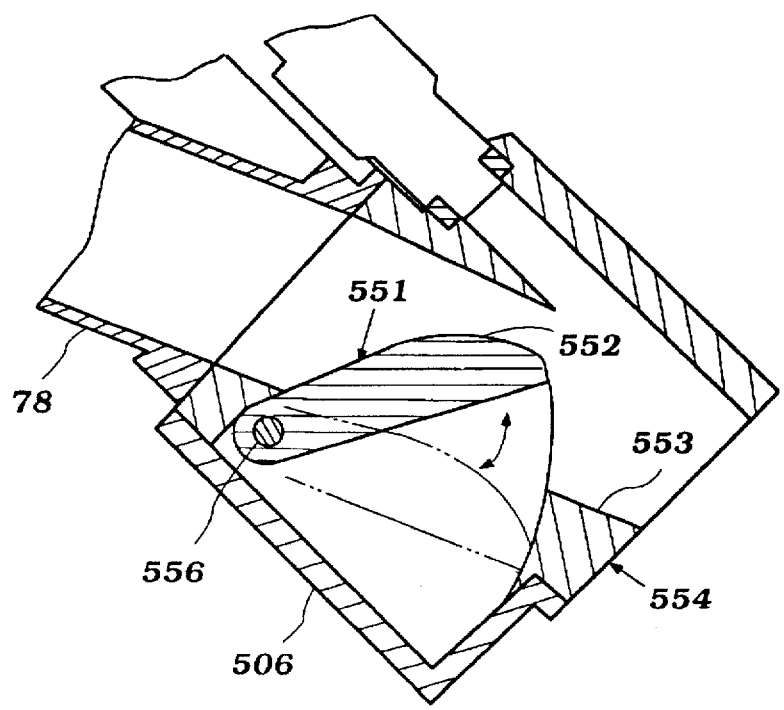
FIG. 38 is a partial cross-sectional view, in part similar to FIG. 37 and also to FIGS. 2, 22, and 29, and shows another embodiment of flow control valve.

Another embodiment employing a pivotally supported vane-type valve 551 is shown in FIG. 38. Again, this valve 551 has a valving surface 552 that cooperates with a flow passage 553 formed in a housing assembly 554. The valve element 551 is supported on an actuating shaft 556, which is pivotal about an axis that extends transverse to the axis of the flow passage 553, but does not extend into it.

In the non-flow restricting position as shown in the phantom-line view of FIG. 38, it will be seen that the flow passage 553 is unobstructed. When the valve element 551 is moved to the flow controlling position as shown in the solid-line view of FIG. 38, then the flow will be restricted through one or two of the valve seats and redirected through the remaining valve seats in accordance with the flow patterns of any of the previously described embodiments.

From the foregoing description it should be readily apparent to those skilled in the art that the invention is particularly adapted in providing a three-intake-valve-per-cylinder arrangement that ensures good and full flow to the combustion chambers without restriction and without turbulence under high-speed, high-load conditions. However, the embodiments are effective in not only increasing the velocity, but also redirecting the flow pattern under low-speed, low-load conditions so as to generate the type of motion and turbulence in the combustion chamber, be it either swirl and tumble or tumble alone. Of course, the foregoing description is that of preferred embodiments of the invention, and various changes and modifications may be made without departing from the spirit and scope of the invention as defined by the appended claims.

I claim:

1. An induction system for an internal combustion engine having a combustion chamber served by at least three intake valve seats, an intake passage arrangement comprised of at least a common section serving each of said intake valve seats, a control valve supported in said common section for controlling the flow therethrough and movable between a first position wherein the flow through each of said valve seats is substantially unrestricted and without significantly affecting the flow direction issuing from said intake valve seats into said combustion chamber and a second position wherein the flow through at least two of said valve seats is substantially restricted and the flow through the other of the valve seats is directed into the combustion chamber in a different direction than when said control valve is in its first position.

2. An induction system as in claim 1, wherein there are only three valve seats and the flow through the other valve seat when the control valve is in its second position is directed more to one side of the valve seat than the other side of the valve seat.

3. An induction system as in claim 2, wherein the other valve seat is disposed at a side of the combustion chamber so that when the control valve is in its second position, the flow of the charge into the combustion chamber follows a slant tumble path with both a tumble and swirl component.

4. An induction system as in claim 1, wherein the intake passage is formed with a restricted flow path in the same section where the flow is directed when the control valve is in its second position so that the redirected motion into the combustion chamber is augmented.

5. An induction system as in claim 4, wherein the control valve in its second position permits restricted flow through the remaining valve seats.

6. An induction system as in claim 1, wherein the control valve has a generally cylindrical shape and forms a substantially continuous unrestricted flow path when in its first position and a channeled flow path when in its second position directed toward the one side of the other valve seat.

7. An induction system as in claim 6, wherein the intake passage is formed with a restricted flow path in the same section where the flow is directed when the control valve is in its second position so that the redirected motion into the combustion chamber is augmented.

8. An induction system as in claim 1, wherein the control valve has a generally cylindrical configuration comprised of a larger diameter portion and a smaller diameter portion, with the larger diameter portion being positioned in the flow path to the valve seats that are restricted when the control valve is in its second position and the smaller diameter portion being disposed in line with the remaining valve seats.

9. An induction system as in claim 8, wherein the control valve is supported for rotation within a control valve body forming a portion of the intake passage and having a stepped bore receiving the different diameter portions of the control valve.

10. An induction system as in claim 2, wherein the directed flow in the second position of the control valve effects tumble in the combustion chamber.

11. An induction system as in claim 10, wherein the redirected flow when the control valve is in its second position also effects swirl in the combustion chamber by causing more flow along one side of the axis of the combustion chamber than along the other side of the combustion chamber axis.

12. An induction system as in claim 11, further including a fuel injector for spraying fuel into the intake passage arrangement.

13. An induction system as in claim 12, wherein the fuel injector sprays fuel into the intake passage arrangement downstream of the control valve.

14. An induction system as in claim 13, wherein the fuel injector sprays the fuel into the common section of the intake passage arrangement.

15. An induction system as in claim 14, wherein the fuel injector sprays fuel in a direction extending generally along the axis of the cylinder bore.

16. An induction system as in claim 14, wherein the fuel injector sprays fuel toward one side of the combustion chamber axis.

17. An induction system as in claim 13, wherein there are only three valve seats and the other valve seat is disposed at a side of the combustion chamber so that when the control valve is in its second position, the flow of the charge into the combustion chamber follows a slant tumble path with both a tumble and swirl component.

18. An induction system as in claim 17, wherein the intake passage is formed with a restricted flow path in the same section where the flow is directed when the control valve is in its second position so that the redirected motion into the combustion chamber is augmented.

19. An induction system as in claim 13, wherein the control valve has a generally cylindrical shape and forms a substantially continuous unrestricted flow path when in its first position and a channeled flow path when in its second position directed toward the one side of the other valve seats.

20. An induction system as in claim 13, wherein the control valve has a generally cylindrical configuration comprised of a larger diameter portion and a smaller diameter portion, with the larger diameter portion being positioned in the flow path to the valve seats that are restricted when the control valve is in its second position and the smaller diameter portion being disposed in line with the remaining valve seats.

21. An induction system as in claim 17, wherein the control valve is supported for rotation within a control valve body forming a portion of the intake passage and having a stepped bore receiving the different diameter portions of the control valve.

22. An induction system as in claim 1, wherein the control valve comprises a cylindrical valve element.

23. An induction system as in claim 22, wherein the cylindrical valve element has a first cut-out portion adapted to define the unrestricted flow portion when in its first position and a second configured portion adapted to define the restricted flow redirecting passage when in its second position.

24. An induction system as in claim 22, wherein the control valve has a generally cylindrical shape and forms a substantially continuous unrestricted flow path when in its first position and a channeled flow path when in its second position directed toward the one side of the other valve seat.

25. An induction system as in claim 24, wherein the intake passage is formed with a restricted flow path in the same section where the flow is directed when the control valve is in its second position so that the redirected motion into the combustion chamber is augmented.

26. An induction system as in claim 22, wherein the control valve has a generally cylindrical configuration comprised of a larger diameter portion and a smaller diameter portion, with the larger diameter portion being positioned in the flow path to the valve seats that are restricted when the control valve is in its second position and the smaller diameter portion being disposed in line with the remaining valve seats.

27. An induction system as in claim 26, wherein the control valve is supported for rotation within a control valve body forming a portion of the intake passage and having a stepped bore receiving the different diameter portions of the control valve.

28. An induction system as in claim 1, wherein the control valve comprises a plate-type valve element.

29. An induction system as in claim 28, wherein the control valve comprises a rotary valve.

30. An induction system as in claim 29, wherein the axis of rotation of the control valve extends across the common section of the intake passage arrangement.

31. An induction system as in claim 29, wherein the axis of rotation of the control valve is disposed at one side of and out of registry with the common section of the intake passage.

32. An induction system as in claim 28, wherein the control valve is a slide valve.

33. An induction system as in claim 2, wherein there are provided a pair of side intake valve seats disposed closer to a plane containing the axis of the combustion chamber and a center valve seat disposed between the side intake valve seats and further from the plane.

34. An induction system as in claim 33, wherein the flow through one of the side valve seats is substantially restricted when the control valve is in its second position.

35. An induction system as in claim 34, wherein the flow through the center valve seat is also substantially restricted when the control valve is in its second position.

36. An induction system as in claim 33, wherein the flow through the center intake valve seat is substantially restricted when the control valve is in its second position.

37. An induction system as in claim 33, wherein the control valve redirects the flow to the combustion chamber through at least one of the side intake valve seats when in its second position.

38. An induction system as in claim 37, wherein the control valve redirects the flow to both of the side valve seats when in its second position.

39. An induction system as in claim 38, wherein the control valve substantially restricts the flow to the center valve seat when in its second position.

40. An induction system as in claim 37, wherein the control valve redirects the flow through the center valve seat when in its second position.

41. An induction system as in claim 40, wherein the control valve substantially restricts the flow to the other side valve seat when in its second position.

42. An induction system as in claim 1, wherein the intake passage arrangement provides a substantially common flow passage up to each of the valve seats.

43. An induction system as in claim 1, wherein there is a wall formed in the engine in the portion of the intake passage arrangement downstream of the control valve for separating the flow to one of the valve seats from the flow to the remaining valve seats.

44. An induction system as in claim 42, further including a communication hole formed in the wall.

45. An induction system as in claim 1, wherein the intake passage arrangement is formed at least in part in a cylinder head of the engine and wherein the control valve forms a portion of a control valve body affixed to the cylinder head.

46. An induction system as in claim 45, further including an intake manifold affixed to said control valve body and supplying an air charge thereto.

47. An induction system as in claim 46, wherein the intake manifold provides two different length effective passages for serving the control valve body.

48. An induction system as in claim 47, further including a further valve for controlling the effective length of the intake passage serving the control valve body.

49. An induction system as in claim 46, wherein the control valve comprises a separate body disposed between the intake manifold and the cylinder head.

50. An induction system as in claim 49, wherein there are a plurality of cylinders each having three intake ports and wherein the control valve body has a separate common passage for each combustion chamber and a separate valve element portion for controlling the flow through a responsive one of said separate passage.

51. An induction system as in claim 50, further including means providing a connection between said valve element portions for permitting thermal expansion while maintaining the angular relationship between the control valve element portions.

52. An induction system as in claim 46, wherein the control valve is comprised of a valve element having a first, generally cylindrical section and a second, adjacent generally cylindrical section of smaller diameter than the first section and wherein the valve body is provided with a counter bore receiving the valve element.

53. An induction system as in claim 52, wherein the cylinder head defines at least two side-by-side combustion chambers, each served by an intake passage arrangement as set forth therein.

54. An induction system as in claim 53, wherein the smaller diameter second portions of the valve elements for adjacent cylinders are adjacent to each other.

55. An induction system as in claim 54, wherein the cylinder head has four combustion chambers, each served by an intake passage arrangement having a control valve as set forth therein.

56. An induction system as in claim 55, wherein the control valve assembly is comprised of two adjacent housing pieces, each receiving a pair of valve elements and wherein the valve elements are disposed so that the two centermost cylinders have their respective valve element first, larger diameter portions adjacent each other.

57. A control valve adapted to be disposed between a cylinder head having a pair of intake ports, each serving a respective combustion chamber formed therein in one surface thereof, said control valve assembly comprising a valve housing having a surface adapted to be placed in abutting relationship with the cylinder head surface and having a pair of intake passages extending therethrough and terminating in said surface, a pair of valve elements rotatably journalled within said valve body and each having a larger diameter section and a smaller diameter section, said valve elements being disposed in said valve body with said smaller diameter sections being adjacent to each other, said smaller diameter sections having a tongue and groove connection with each other for simultaneous rotation.

58. A control valve as in claim 57, wherein the cylinder head has four combustion chambers, each served by an intake passage arrangement having a control valve as set forth therein.

59. A control valve as in claim 58, wherein the control valve assembly is comprised of two adjacent housing pieces, each receiving a pair of valve elements and wherein the valve elements are disposed so that the two centermost cylinders have their respective valve element first, larger diameter portions adjacent each other.

* * * * *